US008373582B2

(12) United States Patent
Hoffberg

(10) Patent No.: US 8,373,582 B2
(45) Date of Patent: Feb. 12, 2013

(54) ADAPTIVE PATTERN RECOGNITION BASED CONTROLLER APPARATUS AND METHOD AND HUMAN-FACTORED INTERFACE THEREFORE

(76) Inventor: Steven M. Hoffberg, West Harrison, NY (US)

( * ) Notice: Subject to any disclaimer, the term of this patent is extended or adjusted under 35 U.S.C. 154(b) by 1774 days.

(21) Appl. No.: 11/467,923

(22) Filed: Aug. 29, 2006

(65) Prior Publication Data

US 2007/0063875 A1   Mar. 22, 2007

Related U.S. Application Data

(63) Continuation of application No. 10/937,044, filed on Sep. 9, 2004, now Pat. No. 7,268,700, and a continuation of application No. 10/899,745, filed on Jul. 27, 2004, now abandoned, and a continuation of application No. 10/899,745, filed on Jul. 27, 2004, now abandoned, which is a continuation of application No. 09/884,542, filed on Jun. 19, 2001, now Pat. No. 6,791,472, which is a continuation of application No. 09/584,056, filed on May 30, 2000, now Pat. No. 6,429,812, which is a continuation of application No. 09/236,184, filed on Jan. 25, 1999, now Pat. No. 6,252,544.

(60) Provisional application No. 60/072,757, filed on Jan. 27, 1998.

(51) Int. Cl.
*G08G 1/123* (2006.01)

(52) U.S. Cl. ............ 340/995.13; 340/539.13; 455/456.3

(58) Field of Classification Search .................. 340/905, 340/908, 990, 995.1, 995.14, 995.15, 995.17, 340/995.24, 539.13

See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,486,853 A | 12/1984 | Parsons |
| 4,672,572 A | 6/1987 | Alsberg |
| 4,789,928 A | 12/1988 | Fujisaki |
| 4,789,929 A | 12/1988 | Nishimura et al. |
| 4,799,156 A | 1/1989 | Shavit et al. |
| 4,823,264 A | 4/1989 | Deming |
| 4,827,508 A | 5/1989 | Shear |
| 4,881,178 A | 11/1989 | Holland et al. |
| 4,887,818 A | 12/1989 | Escott |
| 4,903,201 A | 2/1990 | Wagner |
| 4,930,073 A | 5/1990 | Cina, Jr. |
| 5,016,170 A | 5/1991 | Pollalis et al. |
| 5,070,453 A | 12/1991 | Duffany |
| 5,077,665 A | 12/1991 | Silverman et al. |
| 5,103,476 A | 4/1992 | Waite et al. |
| 5,111,390 A | 5/1992 | Ketcham |
| 5,136,501 A | 8/1992 | Silverman et al. |

(Continued)

FOREIGN PATENT DOCUMENTS

| | | | |
|---|---|---|---|
| JP | 2007240193 A | * | 9/2007 |
| WO | WO 2008056882 A1 | * | 5/2008 |

*Primary Examiner* — Eric M Blount
(74) *Attorney, Agent, or Firm* — Steven M. Hoffberg; Ostrolenk Faber LLP

(57) ABSTRACT

A mobile communications device comprising a location sensing system, producing a location output; a memory, storing a set of locations and associated events; a telecommunications device, communicating event and location information between a remote system and said memory; and a processor, processing said location output in conjunction with said stored locations and associated events in said memory, to determine a priority thereof.

160 Claims, 2 Drawing Sheets

U.S. PATENT DOCUMENTS

| | | | |
|---|---|---|---|
| 5,224,163 A | 6/1993 | Gasser et al. | |
| 5,235,680 A | 8/1993 | Bijnagte | |
| 5,253,165 A | 10/1993 | Leiseca et al. | |
| 5,270,921 A | 12/1993 | Hornick | |
| 5,275,400 A | 1/1994 | Weingardt et al. | |
| 5,283,731 A | 2/1994 | Lalonde et al. | |
| 5,319,705 A | 6/1994 | Halter et al. | |
| 5,343,527 A | 8/1994 | Moore | |
| 5,347,452 A | 9/1994 | Bay, Jr. | |
| 5,377,095 A | 12/1994 | Maeda et al. | |
| 5,390,330 A | 2/1995 | Talati | |
| 5,394,324 A | 2/1995 | Clearwater | |
| 5,459,761 A | 10/1995 | Monica et al. | |
| 5,491,800 A | 2/1996 | Goldsmith et al. | |
| 5,530,235 A | 6/1996 | Stefik et al. | |
| 5,534,975 A | 7/1996 | Stefik et al. | |
| 5,573,244 A | 11/1996 | Mindes | |
| 5,615,109 A | 3/1997 | Eder | |
| 5,615,384 A * | 3/1997 | Allard et al. | 715/800 |
| 5,629,980 A | 5/1997 | Stefik et al. | |
| 5,634,012 A | 5/1997 | Stefik et al. | |
| 5,634,055 A | 5/1997 | Barnewall et al. | |
| 5,638,443 A | 6/1997 | Stefik et al. | |
| 5,640,546 A | 6/1997 | Gopinath et al. | |
| 5,640,569 A | 6/1997 | Miller et al. | |
| 5,664,115 A | 9/1997 | Fraser | |
| 5,672,106 A | 9/1997 | Orford et al. | |
| 5,689,652 A | 11/1997 | Lupien et al. | |
| 5,692,047 A | 11/1997 | McManis | |
| 5,715,403 A | 2/1998 | Stefik | |
| 5,724,488 A | 3/1998 | Prezioso | |
| 5,727,165 A | 3/1998 | Ordish et al. | |
| 5,745,678 A | 4/1998 | Herzberg et al. | |
| 5,748,960 A | 5/1998 | Fischer | |
| 5,749,785 A | 5/1998 | Rossides | |
| 5,757,914 A | 5/1998 | McManis | |
| 5,758,328 A | 5/1998 | Giovannoli | |
| 5,774,073 A * | 6/1998 | Maekawa et al. | 340/995.21 |
| 5,778,367 A | 7/1998 | Wesinger, Jr. et al. | |
| 5,794,207 A | 8/1998 | Walker et al. | |
| 5,797,127 A | 8/1998 | Walker et al. | |
| 5,806,048 A | 9/1998 | Kiron et al. | |
| 5,809,144 A | 9/1998 | Sirbu et al. | |
| 5,819,237 A | 10/1998 | Garman | |
| 5,826,244 A | 10/1998 | Huberman | |
| 5,831,545 A | 11/1998 | Murray et al. | |
| 5,835,896 A | 11/1998 | Fisher et al. | |
| 5,839,114 A | 11/1998 | Lynch et al. | |
| 5,845,211 A | 12/1998 | Roach, Jr. | |
| 5,845,266 A | 12/1998 | Lupien et al. | |
| 5,848,373 A * | 12/1998 | DeLorme et al. | 701/200 |
| 5,873,068 A | 2/1999 | Beaumont et al. | |
| 5,873,071 A | 2/1999 | Ferstenberg et al. | |
| 5,873,782 A | 2/1999 | Hall | |
| 5,884,272 A | 3/1999 | Walker et al. | |
| 5,889,799 A | 3/1999 | Grossman et al. | |
| 5,890,138 A | 3/1999 | Godin et al. | |
| 5,892,900 A | 4/1999 | Ginter et al. | |
| 5,897,620 A | 4/1999 | Walker et al. | |
| 5,905,975 A | 5/1999 | Ausubel | |
| 5,910,987 A | 6/1999 | Ginter et al. | |
| 5,911,136 A | 6/1999 | Atkins | |
| 5,915,019 A | 6/1999 | Ginter et al. | |
| 5,915,209 A | 6/1999 | Lawrence | |
| 5,920,861 A | 7/1999 | Hall et al. | |
| 5,924,082 A | 7/1999 | Silverman et al. | |
| 5,924,083 A | 7/1999 | Silverman et al. | |
| 5,926,796 A | 7/1999 | Walker et al. | |
| 5,940,504 A | 8/1999 | Griswold | |
| 5,941,947 A | 8/1999 | Brown et al. | |
| 5,943,422 A | 8/1999 | Van Wie et al. | |
| 5,948,040 A | 9/1999 | DeLorme et al. | |
| 5,953,319 A | 9/1999 | Dutta et al. | |
| 5,970,479 A | 10/1999 | Shepherd | |
| 5,983,205 A | 11/1999 | Brams et al. | |
| 6,012,045 A | 1/2000 | Barzilai et al. | |
| 6,014,627 A | 1/2000 | Togher et al. | |
| 6,014,643 A | 1/2000 | Minton | |
| 6,021,397 A | 2/2000 | Jones et al. | |
| 6,021,398 A | 2/2000 | Ausubel | |
| 6,023,685 A | 2/2000 | Brett et al. | |
| 6,023,686 A | 2/2000 | Brown | |
| 6,026,383 A | 2/2000 | Ausubel | |
| 6,028,857 A * | 2/2000 | Poor | 370/351 |
| 6,044,363 A | 3/2000 | Mori et al. | |
| 6,047,264 A | 4/2000 | Fisher et al. | |
| 6,047,274 A | 4/2000 | Johnson et al. | |
| 6,055,518 A | 4/2000 | Franklin et al. | |
| 6,058,379 A | 5/2000 | Odom et al. | |
| 6,064,941 A * | 5/2000 | Nimura et al. | 701/210 |
| 6,078,865 A * | 6/2000 | Koyanagi | 701/211 |
| 6,085,175 A | 7/2000 | Gugel et al. | |
| 6,098,051 A | 8/2000 | Lupien et al. | |
| 6,112,181 A | 8/2000 | Shear et al. | |
| 6,131,087 A | 10/2000 | Luke et al. | |
| 6,134,536 A | 10/2000 | Shepherd | |
| 6,141,423 A | 10/2000 | Fischer | |
| 6,144,318 A * | 11/2000 | Hayashi et al. | 340/995.19 |
| 6,151,309 A | 11/2000 | Busuioc et al. | |
| 6,151,589 A | 11/2000 | Aggarwal et al. | |
| 6,154,745 A * | 11/2000 | Kari et al. | 705/1.1 |
| 6,157,721 A | 12/2000 | Shear et al. | |
| 6,161,099 A | 12/2000 | Harrington et al. | |
| 6,163,701 A | 12/2000 | Saleh et al. | |
| 6,167,386 A | 12/2000 | Brown | |
| 6,169,789 B1 | 1/2001 | Rao et al. | |
| 6,175,831 B1 | 1/2001 | Weinreich et al. | |
| 6,185,683 B1 | 2/2001 | Ginter et al. | |
| 6,199,050 B1 | 3/2001 | Alaia et al. | |
| 6,226,618 B1 | 5/2001 | Downs et al. | |
| 6,230,146 B1 | 5/2001 | Alaia et al. | |
| 6,236,977 B1 | 5/2001 | Verba et al. | |
| 6,240,411 B1 | 5/2001 | Thearling | |
| 6,243,691 B1 | 6/2001 | Fisher et al. | |
| 6,249,873 B1 | 6/2001 | Richard et al. | |
| 6,260,024 B1 | 7/2001 | Shkedy | |
| 6,263,334 B1 | 7/2001 | Fayyad et al. | |
| 6,266,652 B1 | 7/2001 | Godin et al. | |
| 6,272,473 B1 | 8/2001 | Sandholm | |
| 6,272,474 B1 | 8/2001 | Garcia | |
| 6,321,212 B1 | 11/2001 | Lange | |
| 6,324,519 B1 | 11/2001 | Eldering | |
| 6,330,551 B1 | 12/2001 | Burchetta et al. | |
| 6,331,986 B1 | 12/2001 | Mitra et al. | |
| 6,360,222 B1 | 3/2002 | Quinn | |
| 6,366,907 B1 | 4/2002 | Fanning et al. | |
| 6,377,809 B1 | 4/2002 | Rezaiifar et al. | |
| 6,393,276 B1 | 5/2002 | Vanghi | |
| 6,398,245 B1 | 6/2002 | Gruse et al. | |
| 6,408,307 B1 * | 6/2002 | Semple et al. | 701/208 |
| 6,415,151 B1 | 7/2002 | Kreppel | |
| 6,415,291 B2 * | 7/2002 | Bouve et al. | 701/201 |
| 6,430,537 B1 | 8/2002 | Tedesco et al. | |
| 6,443,841 B1 | 9/2002 | Rossides | |
| 6,449,612 B1 | 9/2002 | Bradley et al. | |
| 6,459,881 B1 | 10/2002 | Hoder et al. | |
| 6,466,977 B1 | 10/2002 | Sitaraman et al. | |
| 6,480,587 B1 | 11/2002 | Rao et al. | |
| 6,487,541 B1 | 11/2002 | Aggarwal et al. | |
| 6,499,018 B1 | 12/2002 | Alaia et al. | |
| 6,501,765 B1 | 12/2002 | Lu et al. | |
| 6,522,946 B1 | 2/2003 | Weis | |
| 6,530,537 B2 | 3/2003 | Hanlon | |
| 6,542,742 B2 | 4/2003 | Schramm et al. | |
| 6,556,951 B1 | 4/2003 | Deleo et al. | |
| 6,560,580 B1 | 5/2003 | Fraser et al. | |
| 6,564,192 B1 | 5/2003 | Kinney, Jr. et al. | |
| 6,587,837 B1 | 7/2003 | Spagna et al. | |
| 6,591,232 B1 | 7/2003 | Kassapoglou | |
| 6,601,036 B1 | 7/2003 | Walker et al. | |
| 6,606,607 B1 | 8/2003 | Martin et al. | |
| 6,609,112 B1 | 8/2003 | Boarman et al. | |
| 6,611,812 B2 | 8/2003 | Hurtado et al. | |
| 6,629,082 B1 | 9/2003 | Hambrecht et al. | |
| 6,639,898 B1 | 10/2003 | Dutta et al. | |
| 6,647,373 B1 | 11/2003 | Carlton-Foss | |
| 6,658,467 B1 | 12/2003 | Rice et al. | |

| | | | | | | |
|---|---|---|---|---|---|---|
| 6,661,379 B2 | 12/2003 | Stilp et al. | | 7,808,922 B2 | 10/2010 | Dekorsy |
| 6,662,141 B2 | 12/2003 | Kaub | | 7,827,128 B2 | 11/2010 | Karlsson et al. |
| 6,678,245 B1 | 1/2004 | Cooper et al. | | 7,843,822 B1 | 11/2010 | Paul et al. |
| 6,684,250 B2 | 1/2004 | Anderson et al. | | 7,844,535 B2 | 11/2010 | Guler et al. |
| 6,704,713 B1 | 3/2004 | Brett | | 7,890,581 B2 | 2/2011 | Rao et al. |
| 6,712,701 B1 | 3/2004 | Boylan, III et al. | | 7,933,829 B2 | 4/2011 | Goldberg et al. |
| 6,718,312 B1 | 4/2004 | McAfee et al. | | 7,962,346 B2 | 6/2011 | Faltings |
| 6,754,169 B2 | 6/2004 | Baum et al. | | 2001/0027431 A1 | 10/2001 | Rupp et al. |
| 6,766,307 B1 | 7/2004 | Israel et al. | | 2001/0032164 A1 | 10/2001 | Kim |
| 6,785,671 B1 | 8/2004 | Bailey et al. | | 2001/0039528 A1 | 11/2001 | Atkinson et al. |
| 6,799,165 B1 | 9/2004 | Boesjes | | 2001/0042785 A1 | 11/2001 | Walker et al. |
| 6,834,110 B1 | 12/2004 | Marconcini et al. | | 2001/0047291 A1 | 11/2001 | Garahi et al. |
| 6,834,272 B1 | 12/2004 | Naor et al. | | 2001/0049650 A1 | 12/2001 | Moshal et al. |
| 6,842,463 B1 | 1/2005 | Drwiega et al. | | 2001/0051540 A1 | 12/2001 | Hindman et al. |
| 6,847,939 B1 | 1/2005 | Shemesh | | 2002/0010669 A1 | 1/2002 | Street |
| 6,865,559 B2 | 3/2005 | Dutta | | 2002/0010673 A1 | 1/2002 | Muller et al. |
| 6,876,309 B1 | 4/2005 | Lawrence | | 2002/0013631 A1 | 1/2002 | Parunak et al. |
| 6,926,796 B1 | 8/2005 | Nishida et al. | | 2002/0013757 A1 | 1/2002 | Bykowsky et al. |
| 6,934,249 B1 | 8/2005 | Bertin et al. | | 2002/0035534 A1 | 3/2002 | Buist et al. |
| 6,954,731 B1 | 10/2005 | Montague | | 2002/0040310 A1 | 4/2002 | Lieben et al. |
| 6,956,835 B2 | 10/2005 | Tong et al. | | 2002/0042769 A1 | 4/2002 | Gujral et al. |
| 6,959,288 B1 | 10/2005 | Medina et al. | | 2002/0052816 A1 | 5/2002 | Clenaghan et al. |
| 6,968,323 B1 | 11/2005 | Bansal et al. | | 2002/0052819 A1 | 5/2002 | Burton |
| 6,974,412 B2 | 12/2005 | Dobrovolny | | 2002/0052873 A1 | 5/2002 | Delgado et al. |
| 6,978,126 B1 | 12/2005 | Blaker et al. | | 2002/0055899 A1 | 5/2002 | Williams |
| 7,003,485 B1 | 2/2006 | Young | | 2002/0059379 A1 | 5/2002 | Harvey et al. |
| 7,039,598 B2 | 5/2006 | Tobin et al. | | 2002/0073018 A1 | 6/2002 | Mulinder et al. |
| 7,043,245 B2 | 5/2006 | Dokko | | 2002/0073049 A1 | 6/2002 | Dutta |
| 7,047,242 B1 | 5/2006 | Ponte | | 2002/0077954 A1 | 6/2002 | Slaight et al. |
| 7,062,461 B1 | 6/2006 | Ausubel | | 2002/0095327 A1 | 7/2002 | Zumel et al. |
| 7,069,308 B2 | 6/2006 | Abrams | | 2002/0123954 A1 | 9/2002 | Hito |
| 7,076,553 B2 | 7/2006 | Chan et al. | | 2002/0161671 A1 | 10/2002 | Matsui et al. |
| 7,085,682 B1 | 8/2006 | Heller et al. | | 2002/0165756 A1 | 11/2002 | Tobin et al. |
| 7,096,197 B2 | 8/2006 | Messmer et al. | | 2002/0165817 A1 | 11/2002 | Rackson et al. |
| 7,099,839 B2 | 8/2006 | Madoff et al. | | 2002/0174052 A1 | 11/2002 | Guler et al. |
| 7,103,565 B1 | 9/2006 | Vaid | | 2002/0183066 A1 | 12/2002 | Pankaj |
| 7,130,579 B1 | 10/2006 | Rael et al. | | 2002/0194256 A1 | 12/2002 | Needham et al. |
| 7,133,841 B1 | 11/2006 | Wurman et al. | | 2002/0194334 A1 | 12/2002 | Focant et al. |
| 7,142,523 B1 | 11/2006 | Chekuri et al. | | 2003/0014373 A1 | 1/2003 | Perge et al. |
| 7,165,046 B2 | 1/2007 | Ausubel | | 2003/0018561 A1 | 1/2003 | Kitchen et al. |
| 7,184,777 B2 | 2/2007 | Diener et al. | | 2003/0035468 A1 | 2/2003 | Corbaton et al. |
| 7,200,571 B1 | 4/2007 | Jenniges et al. | | 2003/0041002 A1 | 2/2003 | Hao et al. |
| 7,246,164 B2 | 7/2007 | Lehmann et al. | | 2003/0055787 A1 | 3/2003 | Fujii |
| 7,249,027 B1 | 7/2007 | Ausubel | | 2003/0055898 A1 | 3/2003 | Yeager et al. |
| 7,249,085 B1 | 7/2007 | Kinney, Jr. et al. | | 2003/0065608 A1 | 4/2003 | Cutler |
| 7,251,589 B1 | 7/2007 | Crowe et al. | | 2003/0087652 A1 | 5/2003 | Simon et al. |
| 7,287,007 B1 | 10/2007 | Detering | | 2003/0088488 A1 | 5/2003 | Solomon et al. |
| 7,319,973 B1 | 1/2008 | Tobin et al. | | 2003/0097325 A1 | 5/2003 | Friesen et al. |
| 7,330,826 B1 | 2/2008 | Porat et al. | | 2003/0101274 A1 | 5/2003 | Yi et al. |
| 7,337,139 B1 | 2/2008 | Ausubel | | 2003/0115114 A1 | 6/2003 | Tateishi et al. |
| 7,343,342 B2 | 3/2008 | Ausubel | | 2003/0115251 A1 | 6/2003 | Fredrickson et al. |
| 7,349,827 B1 | 3/2008 | Heller et al. | | 2003/0135437 A1 | 7/2003 | Jacobsen |
| 7,415,436 B1 | 8/2008 | Evelyn et al. | | 2003/0139995 A1 | 7/2003 | Farley |
| 7,457,823 B2 | 11/2008 | Shraim et al. | | 2003/0195780 A1 | 10/2003 | Arora et al. |
| 7,460,065 B2 | 12/2008 | Ogawa et al. | | 2003/0217106 A1 | 11/2003 | Adar et al. |
| 7,464,057 B2 | 12/2008 | Cole et al. | | 2003/0233307 A1 | 12/2003 | Salvadori et al. |
| 7,516,089 B1 | 4/2009 | Walker et al. | | 2004/0006528 A1 | 1/2004 | Kevin Fung |
| 7,523,085 B2 | 4/2009 | Nigam et al. | | 2004/0006529 A1 | 1/2004 | Fung |
| 7,559,070 B2 | 7/2009 | Nakamura et al. | | 2004/0006534 A1 | 1/2004 | Fung |
| 7,596,552 B2 | 9/2009 | Levy et al. | | 2004/0024684 A1 | 2/2004 | Montepeque |
| 7,600,017 B2 | 10/2009 | Holtzman et al. | | 2004/0024687 A1 | 2/2004 | Delenda |
| 7,627,510 B2 | 12/2009 | Jain et al. | | 2004/0039670 A1 | 2/2004 | Fung |
| 7,660,783 B2 | 2/2010 | Reed | | 2004/0039685 A1 | 2/2004 | Hambrecht et al. |
| 7,676,423 B2 | 3/2010 | Avery | | 2004/0054551 A1 | 3/2004 | Ausubel et al. |
| 7,693,939 B2 | 4/2010 | Wu et al. | | 2004/0054617 A1 | 3/2004 | Fung |
| 7,698,335 B1 | 4/2010 | Vronay | | 2004/0059665 A1 | 3/2004 | Suri et al. |
| 7,707,118 B2 | 4/2010 | James | | 2004/0068447 A1 | 4/2004 | Mao et al. |
| 7,711,808 B2 | 5/2010 | Parry | | 2004/0093278 A1 | 5/2004 | Burchetta et al. |
| 7,725,414 B2 | 5/2010 | Nigam et al. | | 2004/0117302 A1 | 6/2004 | Weichert et al. |
| 7,729,975 B2 | 6/2010 | Ausubel et al. | | 2004/0132405 A1 | 7/2004 | Kitazawa et al. |
| 7,730,120 B2 | 6/2010 | Singh et al. | | 2004/0153375 A1 | 8/2004 | Mukunya et al. |
| 7,739,335 B2 | 6/2010 | Siegel et al. | | 2004/0184478 A1 | 9/2004 | Donescu et al. |
| 7,742,972 B2 | 6/2010 | Lange et al. | | 2004/0215793 A1 | 10/2004 | Ryan et al. |
| 7,743,163 B2 | 6/2010 | Ruppert | | 2004/0259558 A1 | 12/2004 | Skafidas et al. |
| 7,751,423 B2 | 7/2010 | Hottinen et al. | | 2005/0044032 A1 | 2/2005 | Lee et al. |
| 7,752,064 B2 | 7/2010 | Kauffman | | 2005/0080710 A1 | 4/2005 | Malato et al. |
| 7,774,264 B1 | 8/2010 | Ausubel | | 2005/0137939 A1 | 6/2005 | Calabria et al. |
| 7,797,732 B2 | 9/2010 | Tam et al. | | 2005/0144064 A1 | 6/2005 | Calabria et al. |
| 7,801,802 B2 | 9/2010 | Walker et al. | | 2005/0144065 A1 | 6/2005 | Calabria et al. |

| | | | | | | |
|---|---|---|---|---|---|---|
| 2005/0197857 A1 | 9/2005 | Avery | | 2007/0174179 A1 | 7/2007 | Avery |
| 2005/0198031 A1 | 9/2005 | Pezaris et al. | | 2007/0195048 A1 | 8/2007 | Nam et al. |
| 2005/0246420 A1 | 11/2005 | Little, II | | 2007/0297328 A1 | 12/2007 | Semret et al. |
| 2005/0286426 A1 | 12/2005 | Padhye et al. | | 2008/0095121 A1 | 4/2008 | Shattil |
| 2005/0289043 A1 | 12/2005 | Maudlin | | 2008/0162331 A1 | 7/2008 | Ephrati et al. |
| 2006/0046658 A1 | 3/2006 | Cruz et al. | | 2008/0162666 A1 | 7/2008 | Ebihara et al. |
| 2006/0148414 A1 | 7/2006 | Tee et al. | | 2008/0207149 A1 | 8/2008 | Unkefer et al. |
| 2006/0167787 A1 | 7/2006 | Ausubel | | 2008/0227404 A1 | 9/2008 | Harel et al. |
| 2006/0168119 A1 | 7/2006 | Inoue et al. | | 2008/0299923 A1 | 12/2008 | O'Brien et al. |
| 2006/0168140 A1 | 7/2006 | Inoue et al. | | 2009/0054018 A1 | 2/2009 | Waheed et al. |
| 2006/0168147 A1 | 7/2006 | Inoue et al. | | 2009/0170607 A1 | 7/2009 | Chiao et al. |
| 2006/0259957 A1 | 11/2006 | Tam et al. | | 2009/0180392 A1 | 7/2009 | Greiner et al. |
| 2007/0118463 A1 | 5/2007 | Avery | | | | |
| 2007/0118464 A1 | 5/2007 | Avery | | | | |
| 2007/0118465 A1 | 5/2007 | Avery | | | | |

* cited by examiner

ADAPTIVE PATTERN RECOGNITION BASED CONTROLLER APPARATUS AND METHOD AND HUMAN-FACTORED INTERFACE THEREFORE

The present application is a Continuation of Ser. No. 10/937,044 filed Sep. 9, 2004, and a Continuation of Ser. No. 10/899,745 filed Jul. 27, 2004, and a Continuation of Ser. No. 10/899,850 filed Jul. 27, 2004, which are Continuations of Ser. No. 09/884,542 filed Jun. 19, 2001, which is a Continuation of Ser. No. 09/584,056 filed May 30, 2000, which is a Continuation of Ser. No. 09/236,184 filed Jan. 27, 1998, which claims the benefit of priority from U.S. Provisional Patent Application Ser. No. 60/072,757, each of which is incorporated herein by reference in its entirety.

FIELD OF THE INVENTION

The present invention relates to the field of communications devices, and more particularly to mobile telecommunications devices having position detection and event storage memory.

BACKGROUND OF THE INVENTION

A number of devices are known which provide mobile telecommunication capabilities. Further, known position detection systems employ the known Global Positioning System (GPS), Global Orbiting Navigational System (GLONASS), Loran, RF triangulation, inertial frame reference and Cellular Telephone base site, e.g., time difference of arrival (TDOA) or nearest antenna proximity systems. Known GPS mobile systems include memory to record location, time and event type, and some systems may be integrated with global information systems, to track path, speed, etc. Known Differential GPS (DGPS) systems include mobile telecommunication functionality to communicate between distant units, typically to allow very precise relative position measurements, in the presence of substantial absolute position errors, or to calibrate the position of a mobile transceiver based on a relative position with respect to a fixed transceiver having a known location. These systems do not typically intercommunicate event information between units. Thus, the communications streams relate to position information only. However, known weather balloon transceiver systems, for example, do transmit both position and weather information to a base station.

Many electronic location determination systems are available, or have been proposed, to provide location information to a user equipped with a location determination receiver. Ground-based location determination systems, such as Loran, Omega, TACAN, Decca, U.S. Airforce Joint Tactical Information Distribution System (JTIDS Relnav), or U.S. Army Position Location and Reporting System (PLRS), use the intersection of hyperbolic surfaces to provide location information. A representative ground system is LORAN-C discussed in LORAN-C User Handbook, Department of Transportation, U.S. Coast Guard, Commandant Instruction M16562.3, May 1990, which is incorporated by reference herein. LORAN-C provides a typical location accuracy of approximately 400 meters. A limitation of a LORAN-C location determination system is that not all locations in the northern hemisphere, and no locations in the southern hemisphere, are covered by LORAN-C. A second limitation of LORAN-C is that the typical accuracy of approximately 400 meters is insufficient for many applications. A third limitation of LORAN-C is that weather, local electronic signal interference, poor crossing angles, closely spaced time difference hyperbolas, and skywaves (multipath interference) frequently cause the accuracy to be significantly worse than 400 meters.

Other ground-based location determination devices use systems that were developed primarily for communications, such as cellular telephone, FM broadcast, and AM broadcast. Some cellular telephone systems provide estimates of location, using comparison of signal strengths from three or more sources. FM broadcast systems having subcarrier signals can provide estimates of location by measuring the phases of the subcarrier signals. Kelley et al. in U.S. Pat. No. 5,173,710 disclose a system that allows determination of a location of a vehicle. FM subcarrier signals are received from three FM radio stations with known locations but unknown relative phases by signal processors at the vehicle as well as at a fixed station having a known location. The fixed station processor determines the relative phase of the signals transmitted by the three FM radio stations and transmits the relative phase information to the vehicle. The vehicle processor determines its location from the FM subcarrier signal phases and from the relative phase information it receives. A limitation of cellular systems and FM subcarrier systems for location determination is that they are limited to small regions, with diameters of the order of 20-50 km.

Satellite-based location determination systems such as GPS and GLONASS, use the intersection of spherical surface areas to provide location information with a typical (selective availability) accuracy of 100 meters, anywhere on or near the surface of the earth. These systems may also be used to obtain positional accuracies within 1 centimeter. The satellite-based location determination systems include satellites having signal transmitters to broadcast location information and control stations on earth to track and control the satellites. Location determination receivers process the signals transmitted from the satellites and provide location information to the user.

The Global Positioning System (GPS) is part of a satellite navigation system developed by the United States Defense Department under its NAVSTAR satellite program. A fully operational GPS includes up to 24 satellites approximately uniformly dispersed around six circular orbits with four satellites each, the orbits being inclined at an angle of 55°, relative to the equator, and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time, relative to the Earth below. Theoretically, four or more GPS satellites will have line of sight to most points on the Earth's surface, and line of sight access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

A second configuration for global positioning is GLONASS, placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 sidereal days. The signal frequencies of both GPS and GLONASS are in L-band (1 to 2 GHz).

Because the signals from the satellites pass through the troposphere for only a short distance, the accuracy of satellite location determination systems such as GPS or GLONASS is largely unaffected by weather or local anomalies. A limitation of GLONASS is that it is not clear that the Russian Republic has the resources to complete and to maintain the system for full world wide 24 hour coverage.

The inherent accuracy of the GPS position measured by a commercial GPS receiver is approximately 20 meters. However, the United States Government currently intentionally degrades the accuracy of GPS computed positions for commercial users with Selective Availability, SA. With SA, the GPS position accuracy of a commercial GPS receiver is approximately 100 meters. However, higher accuracy is available with the use of secret decryption codes.

Differential Global Positioning System, DGPS, is a technique for enhancing the accuracy of the GPS position, and of course may be applied to GLONASS as well. The DGPS comprises the Global Positioning System together with a GPS reference station receiver situated at a known position. DGPS error correction information is derived by taking the difference between the measurements made by the GPS reference station and the expected measurement at the known position of the reference station. DGPS error correction information can be in the form of GPS satellite pseudorange offsets or GPS position offsets. If GPS position offsets are used, the GPS satellites used in the calculation of the GPS position must be included as part of the DGPS error correction information. A processor in a "differential-ready" GPS receiver applies the DGPS error correction information to enhance the GPS position to an accuracy in the range of 10 meters to a less than one meter.

Two types of DGPS exist, postprocessed and realtime. In postprocessed systems, the DGPS error correction information and a user's GPS position information are processed after the user has completed his data acquisition. In realtime systems, the DGPS error correction information is transmitted to the GPS user in a DGPS telemetry stream, e.g., a radio wave signal, and processed by a differential-ready GPS receiver as the application progresses. Realtime processing is desirable for many applications because the enhanced accuracy of DGPS is available to the GPS user while in the field. Realtime broadcast of DGPS error correction information is available from many sources, both public and private, including Coast Guard RDF beacon and commercially operated FM broadcast subcarriers. A DGPS radio wave receiver is required to receive the DGPS radio wave signal containing the DGPS error correction information, and pass the DGPS error corrections to the differential-ready GPS receiver.

Many applications of GPS including mineral surveying, mapping, adding attributes or features to maps, finding sites on a map, vehicle navigation, airplane navigation, marine navigation, field asset management, geographical information systems, and others require the enhanced accuracy that is available with DGPS. For instance, a 20 to 100 meter error could lead to unintentional trespassing, make the return to an underground asset difficult, or put a user on the wrong block while walking or driving in a city. These applications require a computer to store and process data, retain databases, perform calculations, display information to a user, and take input from a user entry. For instance, the user may need to store a map database, display a map, add attributes to features on the map, and store these attributes for geographical information. The user may also need to store and display locations or calculate range and bearing to another location.

GPS is typically used by many professionals engaged in navigation and surveying fields such as marine navigation, aircraft piloting, seismology, boundary surveying, and other applications where accurate location is required or where the cost of GPS is small compared to the cost of a mistake in determining location. Some mobile professionals in the utilities, insurance, ranching, prospecting, ambulance driving, trucking, delivery, police, fire, real estate, forestry, and other mobile applications use GPS to save time in their work. GPS is also used for personal travel such as hiking, biking, horseback riding, yachting, fishing, driving in personal cars, and other travel activities. To enhance the usefulness of GPS a number of sources have integrated maps into the output, or provide a global information system (GIS) to process the GPS output. Thus, it is known to sort and display proximate map features and/or attributes in the same coordinate system as the position information.

As disclosed in U.S. Pat. No. 5,528,248, incorporated herein by reference, a satellite location determination system using Global Positioning System (GPS) satellite signal transmitters receives a spread spectrum L1 carrier signal having a frequency=1575.42 MHz. The L1 signal from each satellite signal transmitter is binary phase shift key (BPSK) modulated by a Coarse/Acquisition (C/A) pseudo-random noise (PRN) code having a clock or chip rate of $f0=1.023$ MHz. Location information is transmitted at a rate of 50 baud. The PRN codes allow use of a plurality of GPS satellite signal transmitters for determining an observer's position and for providing location information. A signal transmitted by a particular GPS satellite is selected by generating and correlating the PRN code for that particular satellite signal transmitter with a GPS signal received from that satellite. All C/A PRN codes used for GPS satellite signals are known and are stored and/or generated in a GPS receiver. A bit stream from the GPS satellite signal transmitter includes an ephemeris location of the GPS satellite signal transmitter, an almanac location for all GPS satellites, and correction parameters for ionospheric signal propagation delay, and clock time of the GPS satellite signal transmitter. Accepted methods for generating the C/A-code are set forth in the document GPS Interface Control Document ICD-GPS-200, published by Rockwell International Corporation, Satellite Systems Division, Revision A, 26 Sep. 1984, which is incorporated by reference herein.

Energy on a single carrier frequency from all of the satellites is transduced by the receiver at a point close to Earth. The satellites from which the energy originated are identified by modulating the carrier transmitted from each satellite with pseudorandom type signals. In one mode, referred to as the coarse/acquisition (C/A) mode, the pseudorandom signal is a gold code sequence having a chip rate of 1.023 MHz; there are 1,023 chips in each gold code sequence, such that the sequence is repeated once every millisecond (the chipping rate of a pseudorandom sequence is the rate at which the individual pulses in the sequence are derived and therefore is equal to the code repetition rate divided by the number of members in the code; one pulse of the noise code is referred to as a chip).

The 1.023 MHz gold code sequence chip rate enables the position of the receiver responsive to the signals transmitted from four of the satellites to be determined to an accuracy of approximately 60 to 300 meters.

There is a second mode, referred to as the precise or protected (P) mode, wherein pseudorandom codes with chip rates of 10.23 MHz are transmitted with sequences that are extremely long, so that the sequences repeat no more than once per week. In the P mode, the position of the receiver can be determined to an accuracy of approximately 16 to 30 meters. However, the P mode requires Government classified information about how the receiver is programmed and is intended for use only by authorized receivers. Hence, civilian and/or military receivers that are apt to be obtained by unauthorized users are not responsive to the P mode.

To enable the receivers to separate the C/A signals received from the different satellites, the receiver includes a plurality of different locally derived gold code sources, each of which corresponds with the gold code sequence transmitted from one of the satellites in the field of the receiver. The locally derived and the transmitted gold code sequences are cross correlated with each other over one millisecond, gold code sequence intervals. The phase of the locally derived gold code sequences vary on a chip-by-chip basis, and then within a chip, until the maximum cross correlation function is obtained. Since the cross correlation for two gold code sequences having a length of 1,023 bits is approximately 16 times as great as the cross correlation function of any of the other combinations of gold code sequences, it is relatively easy to lock the locally derived gold code sequence onto the same gold code sequence that was transmitted by one of the satellites.

The gold code sequences from at least four of the satellites in the field of view of the receiver are separated in this manner by using a single channel that is sequentially responsive to each of the locally derived gold code sequences or by using parallel channels that are simultaneously responsive to the different gold code sequences. After four locally derived gold code sequences are locked in phase with the gold code sequences received from four satellites in the field of view of the receiver, the position of the receiver can be determined to an accuracy of approximately 60 to 300 meters.

The approximately 60 to 300 meter accuracy of GPS is determined by (1) the number of satellites transmitting signals to which the receiver is effectively responsive, (2) the variable amplitudes of the received signals, and (3) the magnitude of the cross correlation peaks between the received signals from the different satellites.

In response to reception of multiple pseudorange noise (PRN) signals, there is a common time interval for some of the codes to likely cause a degradation in time of arrival measurements of each received PRN due to the cross correlations between the received signals. The time of arrival measurement for each PRN is made by determining the time of a peak amplitude of the cross correlation between the received composite signal and a local gold code sequence that is identical to one of the transmitted PRN. When random noise is superimposed on a received PRN, increasing the averaging time of the cross correlation between the signal and a local PRN sequence decreases the average noise contribution to the time of arrival error. However, because the cross correlation errors between the received PRN's are periodic, increasing the averaging time increases both signal and the cross correlation value between the received PRN's alike and time of arrival errors are not reduced.

The GPS receiver may incorporate a Kalman filter, which is adaptive and therefore automatically modifies its threshold of acceptable data perturbations, depending on the velocity of the vehicle (GPS antenna). This optimizes system response and accuracy of the GPS system. Generally, when the vehicle increases velocity by a specified amount, the GPS Kalman filter will raise its acceptable noise threshold. Similarly, when the vehicle decreases its velocity by a specified amount, the GPS Kalman filter will lower its acceptable noise threshold.

Extremely accurate GPS receivers depend on phase measurements of the radio carriers that they receive from various orbiting GPS satellites. Less accurate GPS receivers simply develop the pseudoranges to each visible satellite based on the time codes being sent. Within the granularity of a single time code, the carrier phase can be measured and used to compute range distance as a multiple of the fundamental carrier wavelength. GPS signal transmissions are on two synchronous, but separate, carrier frequencies "L1" and "L2", with wavelengths of nineteen and twenty-four centimeters, respectively. Thus within nineteen or twenty-four centimeters, the phase of the GPS carrier signal will change 360° ($2\pi$ radians). However, the number of whole cycle (360°) carrier phase shifts between a particular GPS satellite and the GPS receiver must be resolved. At the receiver, every cycle will appear essentially the same, over a short time frame. Therefore there is an "integer ambiguity" in the calculation. The resolution of this integer ambiguity is therefore a calculation-intensive arithmetic problem to be solved by GPS receivers. The traditional approaches to such integer ambiguity resolution have prevented on-the-fly solution measurement updates for moving GPS receivers with centimeter accurate outputs. Very often, such highly accurate GPS receivers have required long periods of motionlessness to produce a first and subsequent position fix.

There are numerous prior art methods for resolving integer ambiguities. These include integer searches, multiple antennas, multiple GPS observables, motion-based approaches, and external aiding. Search techniques often require significant computation time and are vulnerable to erroneous solutions or when only a few satellites are visible. More antennas can improve reliability considerably. If carried to an extreme, a phased array of antennas results, whereby the integers are completely unambiguous and searching is unnecessary. But for economy, reduced size, complexity and power consumption, the minimum number of antennas required to quickly and unambiguously resolve the integers, even in the presence of noise, is preferred.

One method for integer resolution is to make use of the other observables that modulate a GPS timer. The pseudo-random code imposed on the GPS satellite transmission can be used as a coarse indicator of differential range, although it is very susceptible to multipath problems. Differentiating the L1 and L2 carriers in phase sensitive manner provides a longer effective wavelength, and reduces the search space, i.e., an ambiguity distance increased from 19 or 24 centimeters to about 456 centimeters. However, dual frequency receivers are expensive because they are more complicated. Motion-based integer resolution methods make use of additional information provided by platform or satellite motion. But such motion may not always be present when it is needed. Another prior art technique for precision attitude determination and kinematic positioning is described by Hatch, in U.S. Pat. No. 4,963,889, incorporated herein by reference, which employs two spaced antennas, moveable with respect to each other. Knight, U.S. Pat. No. 5,296,861, incorporated herein by reference, provides a method of reducing the mathematical intensity of integer ambiguity resolution. See also, U.S. Pat. No. 5,471,218, incorporated herein by reference.

Direct range measurements, combined with the satellite geometry, may also allow the correct integer carrier phase ambiguities to be determined for a plurality of satellites tracked at two or more sites. The use of additional sensors, such as a laser level, electronic distance meter, a compass, a tape, etc., provide valuable constraints that limit the number of possible integer ambiguities that need to be considered in a search for the correct set.

Many systems using handheld computers, having software and databases defining maps and running standard operating systems, have been coupled to GPS Smart Antennas. Wireless, infrared, serial, parallel, and PCMCIA interfaces have been used to interconnect the handheld computer and the GPS Smart Antenna. Differential-ready GPS Smart Antennas having an input to receive signals representative of DGPS error corrections are also commercially available. Further, GPS receivers and Differential-ready GPS Smart Antennas which are self contained, built onto a type II PCMCIA card (PC Card), and/or having serial data communications ports (RS-232 or RS-422) are commercially available. See, U.S. Pat. Nos. 5,276,451, and 5,210,540, assigned to Pioneer Electronic Corporation.

There are several different types of vehicle navigational systems. The first system makes use of stored map displays wherein the maps of a predetermined area are stored in the in-vehicle computer and displayed to the vehicle operator or driver. The maps, combined with information describing the location where the vehicle started and where it is to go, will highlight the direction and the driver will have to read the display and follow the route. One such stored map display system was offered by General Motors on their 1994 Oldsmobile, using Global Positioning System (GPS) satellites and dead reckoning techniques, and likely map matching to determine a precise location. The vehicle has radio receivers for receiving data from satellites, giving the location of the receiver expressed in latitude and longitude. The driver enters details of the desired destination into an on-board or in-vehicle computer in the form of specific address, a road intersection, etc. The stored map is displayed, allowing the operator to pinpoint the desired destination. The on-board computer then seeks to calculate the most efficient route, displaying the distance to, and the direction of, each turn using graphics and a voice prompt.

Other known systems employ speech recognition as a user input. For example, another system, described in U.S. Pat. No. 5,274,560 does not use GPS and has no sensing devices connected to the vehicle. The routing information is contained in a device that is coupled to a CD player in the vehicle's audio system. Commands are entered into the system via a microphone and the results are outputted through the vehicle's speakers. The vehicle operator spells out the locations and destinations, letter by letter. The system confirms the locations by repeating whole words. Once the system has received the current location and destination, the system develops the route and calculates the estimated time. The operator utilizes several specific performance commands, such as "Next", and the system then begins to give segment by segment route directions.

Still another system, such as the Siemens Ali-Scout™ system, requires that the driver key-in the destination address coordinates into the in-vehicle computer. A compass located in the vehicle then gives a "compass" direction to the destination address. Such a compass direction is shown in graphics as an arrow on a display unit, indicating the direction the driver should go. Along the side of the road are several infrared beacon sites which transmit data information to a properly equipped vehicle relative to the next adjacent beacon site. From all of the information received, the in-vehicle computer selects the desired beacon data information to the next beacon and displays a graphic symbol for the vehicle operator to follow and the distance to the desired destination. In this system, there is no map to read; both a simple graphic symbol and a segment of the route is displayed, and a voice prompt telling the vehicle operator when to turn and when to continue in the same direction is enunciated. Once the program begins, there is minimal operator feedback required.

U.S. Pat. No. 4,350,970, describes a method for traffic management in a routing and information system for motor vehicle traffic. The system has a network of stationary routing stations each located in the vicinity of the roadway, which transmit route information and local information concerning its position to passing vehicles. The trip destination address is loaded by the vehicle operator into an onboard device in the vehicle and by dead reckoning techniques, a distance and direction graphic message is displayed. The first routing station which the vehicle passes transmits a message to the vehicle with route data to the next routing station. The vehicle receives the message and as it executes the several vector distances in the message, it accumulates time and distance which it then transmits to the second routing station when it is interrogated by the second routing station. In this manner, traffic management is updated in real time and the vehicles are always routed the "best way". Of course, the best way may be the shortest way, the less traveled way, the cheapest way or any combination of these plus other criteria. See also, U.S. patent application Ser. No. 08/258,241, filed on Aug. 3, 1994.

U.S. Pat. No. 5,668,880, incorporated herein by reference, relates to an intervehicle data communication device.

Systems which integrate GPS, GLONASS, LORAN or other positioning systems into vehicular guidance systems are well known, and indeed navigational purposes were prime motivators for the creation of these systems. Radar, laser, acoustic and visual sensors have all been applied to vehicular guidance and control, as well. For example, U.S. Pat. No. 4,757,450 relates to a reflected beam system for detecting a preceding vehicle, in order to allow control over intervehicular spacing. U.S. Pat. No. 4,833,469 relates to an obstacle proximity sensor, employing, e.g., a radar beam to determine distance and relative velocity of an obstacle. U.S. Pat. No. 5,600,561 relates to a vehicle distance data processor which computes a velocity vector based on serial timepoints. U.S. Pat. No. 4,552,456 relates to an optical pulse radar for an automobile. U.S. Pat. No. 4,543,577 relates to a moving obstacle detection system for a vehicle, using Doppler radar. U.S. Pat. No. 4,349,823 relates to an automotive radar system for monitoring objects in front of the vehicle. U.S. Pat. No. 5,473,538 relates to a collision judging system for a vehicle, triggered by a braking event and determining a distance to an obstacle in front of the vehicle. U.S. Pat. No. 4,168,499 relates to an anti-collision radar system. U.S. Pat. No. 4,626,850 relates to a vehicle detection and collision avoidance apparatus, using an acoustic sensor. U.S. Pat. No. 4,028,662 relates to a passing vehicle signaling apparatus, to detect adjacent vehicles during a lane change. U.S. Pat. No. 5,541,590 relates to a vehicle crash predictive and evasive system, employing neural networks. U.S. Pat. No. 5,646,612 relates to a vehicle collision avoidance system, using an infrared imaging system. U.S. Pat. No. 5,285,523 relates to a neural network system for recognizing driving conditions and controlling the vehicle in dependence thereon. U.S. Pat. No. 5,189,619 relates to an artificial intelligence based adaptive vehicle control system. U.S. Pat. No. 5,162,997 relates to a driver-adaptive automobile control system. U.S. Pat. No. 3,689,882 relates to an anti-collision radar system for detecting obstacles or on-coming vehicles.

U.S. Pat. No. 4,855,915 relates to a vehicle which may be autonomously guided using optically reflective materials. U.S. Pat. No. 5,347,456 relates to an intelligent roadway reference system for controlling lateral position of a vehicle, using magnetic sensors. U.S. Pat. No. 5,189,612 relates to an autonomous vehicle guidance system employing buried magnetic markers. U.S. Pat. No. 5,039,979 relates to a roadway alarm system employing metallized painted divider lines. U.S. Pat. No. 4,239,415 relates to a method for installing an electromagnetic sensor loop in a highway. U.S. Pat. No. 4,185,265 relates to a vehicular magnetic coded signaling apparatus which transmits binary signals using magnetic signposts. U.S. Pat. No. 5,687,215 relates to a vehicular emergency message system. U.S. Pat. No. 5,550,055 relates to a position monitoring system for vehicles, for example in case they are stolen. U.S. Pat. No. 5,563,071 relates to a system for time and/or event logging of an event, employing differential GPS. U.S. Pat. No. 5,701,328 relates to a chirped spread spectrum positioning system.

U.S. Pat. Nos. 5,689,269, 5,119,504, 5,678,182, 5,621,793, 5,673,305, 5,043,736, 5,684,860, 5,625,668, 5,602,739, 5,544,225, 5,461,365, 5,299,132, 5,301,368, 5,633,872, 5,563,607, 5,382,957, 5,638,078, 5,630,206, 5,610,815, 4,677,555, 4,700,301, 4,807,131, 4,963,889, 5,030,957, 5,144,317, 5,148,179, 5,247,306, 5,296,861, 5,347,286, 5,359,332, 5,442,363, 5,451,964, expressly incorporated herein by reference, relate to systems which employ GPS and telecommunication functionality. Such systems are often employed in differential global positioning system (DGPS) and vehicular security and tracking applications.

Typical "secure" encryption systems include the Rivest-Shamir-Adelman algorithm (RSA), the Diffie-Hellman algorithm (DH), the Data Encryption Standard (DES), elliptic curve encryption algorithms, so-called PGP algorithm, and other known algorithms. U.S. Pat. Nos. 4,200,770, 4,218,582, 4,405,829, 4,424,414 and 4,424,415, expressly incorporated herein by reference, relate to RSA-type encryption systems. Other cryptographic system patents include U.S. Pat. Nos. 4,658,094 and 4,797,920, incorporated herein by reference. See also:

"A Method for Obtaining Digital Signatures and Public-Key Cryptosystems." By R. L. Rivest, A. Shamir, and L. Adelman, Communication of the ACM, February 1978, Volume 21 Number 2. Pages 120-126.

The Art of Computer Programming, Volume 2: Seminumerical Algorithms, By D. E. Knuth, Addison-Wesley, Reading, Mass. 1969.

"The First Ten Years of Public Key Cryptography", By Whitfield Diffie, Proceedings of the IEEE, Volume 6 Number 5, May 1988, Pages 560-577.

U.S. Pat. Nos. 4,668,952; 4,698,632; 4,700,191; 4,709,407; 4,725,840; 4,750,215; 4,791,420; 4,801,938; 4,805,231; 4,818,997; 4,841,302; 4,862,175; 4,887,068; 4,939,521; 4,949,088; 4,952,936; 4,952,937; 4,954,828; 4,961,074; 5,001,777; 5,049,884; 5,049,885; 5,063,385; 5,068,663; 5,079,553; 5,083,129; 5,122,802; 5,134,406; 5,146,226; 5,146,227; 5,151,701; 5,164,729; 5,206,651; 5,239,296; 5,250,951; 5,268,689; 5,270,706; 5,300,932; 5,305,007; 5,315,302; 5,317,320; 5,331,327; 5,341,138; 5,347,120; 5,363,105; 5,365,055; 5,365,516; 5,389,930; 5,410,750; 5,446,923; 5,448,638; 5,461,383; 5,465,413; 5,513,110; 5,521,696; 5,525,989; 5,525,996; 5,528,245; 5,528,246; 5,529,139; 5,510,793; 5,529,139; 5,610,815, expressly incorporated herein by reference, relate to radar and radar detection and identification systems, and associated technologies.

U.S. Pat. No. 5,519,718, incorporated herein by references, relates to a mobile bidirectional pager communication scheme.

U.S. Pat. No. 5,218,620, incorporated herein by references, relates to a spread spectrum communication device.

U.S. Pat. Nos. 3,161,871; 3,568,161; 3,630,079; 3,664,701; 3,683,114; 3,769,710; 3,771,483; 3,772,688; 3,848,254; 3,922,673; 3,956,797; 3,986,119; 3,993,955; 4,002,983; 4,010,619; 4,024,382; 4,077,005; 4,084,323; 4,114,155; 4,152,693; 4,155,042; 4,168,576; 4,229,620; 4,229,737; 4,235,441; 4,240,079; 4,244,123; 4,274,560; 4,313,263; 4,323,921; 4,333,238; 4,359,733; 4,369,426; 4,384,293; 4,393,270; 4,402,049; 4,403,291; 4,428,057; 4,437,151; 4,445,118; 4,450,477; 4,459,667; 4,463,357; 4,471,273; 4,472,663; 4,485,383; 4,492,036; 4,508,999; 4,511,947; 4,514,665; 4,518,902; 4,521,885; 4,523,450; 4,529,919; 4,547,778; 4,550,317; 4,555,651; 4,564,085; 4,567,757; 4,571,847; 4,578,678; 4,591,730; 4,596,988; 4,599,620; 4,600,921; 4,602,279; 4,613,867; 4,622,557; 4,630,685; 4,633,966; 4,637,488; 4,638,445; 4,644,351; 4,644,368; 4,646,096; 4,647,784; 4,651,157; 4,652,884; 4,654,879; 4,656,463; 4,656,476; 4,659,970; 4,667,203; 4,673,936; 4,674,048; 4,677,555; 4,677,686; 4,678,329; 4,679,147; 4,680,715; 4,682,953; 4,684,247; 4,688,244; 4,690,610; 4,691,149; 4,691,385; 4,697,281; 4,701,760; 4,701,934; 4,703,444; 4,706,772; 4,709,195; 4,713,767; 4,718,080; 4,722,410; 4,727,492; 4,727,962; 4,728,922; 4,730,690; 4,731,613; 4,740,778; 4,741,245; 4,741,412; 4,743,913; 4,744,761; 4,750,197; 4,751,512; 4,751,983; 4,754,280; 4,754,283; 4,755,905; 4,758,959; 4,761,742; 4,772,410; 774,671; 4,774,672; 4,776,750; 4,777,818; 4,781,514; 4,785,463; 4,786,164; 4,790,402; 4,791,572; 4,792,995; 4,796,189; 4,796,191; 4,799,062; 4,804,893; 4,804,937; 4,807,714; 4,809,005; 4,809,178; 4,812,820; 4,812,845; 4,812,991; 4,814,711; 4,815,020; 4,815,213; 4,818,171; 4,819,053; 4,819,174; 4,819,195; 4,819,860; 4,821,294; 4,821,309; 4,823,901; 4,825,457; 4,829,372; 4,829,442; 4,831,539; 4,833,477; 4,837,700; 4,839,835; 4,846,297; 4,847,862; 4,849,731; 4,852,146; 4,860,352; 4,861,220; 4,864,284; 4,864,592; 4,866,450; 4,866,776; 4,868,859; 4,868,866; 4,869,635; 4,870,422; 4,876,659; 4,879,658; 4,882,689; 4,882,696; 4,884,348; 4,888,699; 4,888,890; 4,891,650; 4,891,761; 4,894,655; 4,894,662; 4,896,370; 4,897,642; 4,899,285; 4,901,340; 4,903,211; 4,903,212; 4,904,983; 4,907,159; 4,908,629; 4,910,493; 4,910,677; 4,912,475; 4,912,643; 4,912,645; 4,914,609; 4,918,425; 4,918,609; 4,924,402; 4,924,417; 4,924,699; 4,926,336; 4,928,105; 4,928,106; 4,928,107; 4,932,910; 4,937,751; 4,937,752; 4,939,678; 4,943,925; 4,945,501; 4,947,151; 4,949,268; 4,951,212; 4,954,837; 4,954,959; 4,963,865; 4,963,889; 4,968,981; 4,970,652; 4,972,431; 4,974,170; 4,975,707; 4,976,619; 4,977,679; 4,983,980; 4,986,384; 4,989,151; 4,991,304; 4,996,645; 4,996,703; 5,003,317; 5,006,855; 5,010,491; 5,014,206; 5,017,926; 5,021,792; 5,021,794; 5,025,261; 5,030,957; 5,030,957; 5,031,104; 5,036,329; 5,036,537; 5,041,833; 5,043,736; 5,043,902; 5,045,861; 5,046,011; 5,046,130; 5,054,110; 5,055,851; 5,056,106; 5,059,969; 5,061,936; 5,065,326; 5,067,082; 5,068,656; 5,070,404; 5,072,227; 5,075,693; 5,077,557; 5,081,667; 5,083,256; 5,084,822; 5,086,390; 5,087,919; 5,089,826; 5,097,269; 5,101,356; 5,101,416; 5,102,360; 5,103,400; 5,103,459; 5,109,399; 5,115,223; 5,117,232; 5,119,102; 5,119,301; 5,119,504; 5,121,326; 5,122,803; 5,122,957; 5,124,915; 5,126,748; 5,128,874; 5,128,979; 5,144,318; 5,146,231; 5,148,002; 5,148,179; 5,148,452; 5,153,598; 5,153,836; 5,155,490; 5,155,491; 5,155,591; 5,155,688; 5,155,689; 5,157,691; 5,161,886; 5,168,452; 5,170,171; 5,172,321; 5,175,557; 5,177,685; 5,184,123; 5,185,610; 5,185,761; 5,187,805; 5,192,957; 5,193,215; 5,194,871; 5,202,829; 5,208,756; 5,210,540; 5,210,787; 5,218,367; 5,220,507; 5,220,509; 5,223,844; 5,225,842; 5,228,695; 5,228,854; 5,245,537; 5,247,440; 5,257,195; 5,260,778; 5,265,025; 5,266,958; 5,269,067; 5,272,483; 5,272,638; 5,274,387; 5,274,667; 5,276,451; 5,278,424;

5,278,568; 5,292,254; 5,293,318; 5,305,386; 5,309,474; 5,317,321; 5,319,548; 5,323,322; 5,324,028; 5,334,974; 5,334,986; 5,347,285; 5,349,531; 5,364,093; 5,365,447; 5,365,450; 5,375,059; 5,379,224; 5,382,957; 5,382,958; 5,83,127; 5,389,934; 5,390,125; 5,392,052; 5,400,254; 5,402,347; 5,402,441; 5,404,661; 5,406,491; 5,406,492; 5,408,415; 5,414,432; 5,416,712; 5,418,537; 5,418,538; 5,420,592; 5,420,593; 5,420,594; 5,422,816; 5,424,951; 5,430,948; 5,432,520; 5,432,542; 5,432,841; 5,433,446; 5,434,574; 5,434,787; 5,434,788; 5,434,789; 5,519,403; 5,519,620; 5,519,760; 5,528,234; 5,528,248; 5,565,874 and Re32,856, expressly incorporated herein by reference, relate to GPS systems and associated technologies.

Foreign patent references CA 1298387, 19920300; CA 1298903, 19920400; CA 2009171/1990 02; DE 3310111, 19840900; DE 3325397/1985 01; DE 3419156, 19840500; DE 3538908A1, 19870500; DE 4123097; EP 0155776/1990 08; EP 0158214, 19851000; EP 0181012, 19860500; EP 0290725/1992 09; EP 0295678, 19880600; EP 0309293A2, 19890300; EP 0323230, 19890500; EP 0323246, 19890700; EP 0348528, 19900100; EP 0393935, 19901000; EP 0444738, 19910900; EP 0485120, 19920500; EP 0501058/1991 04; EP 0512789, 19921100; FR 2554612, 19850500; GB 2079453, 19820100; GB 211204, 19830600; GB 2126040, 19870100; GB 2238870, 19891100; GB 2256987; JP 57-32980, 19820200; JP 63-26529, 19840200; JP 1130299, 19871100; JP 1136300, 19871100; JP 153180, 19890300; JP 63188517, 19890500; JP 0189414, 19900700; JP 2212713, 19900800; JP 02-243984, 19900900; JP 03-17688, 19910100; JP 3-080062, 1991 04 12; JP 3-080063, 1991 04 12; JP 0078678, 19910400; JP 0092714, 19910400; JP 1272656, 19910900; JP 03245075, 19911000; JP 3245076, 19911000; JP 63-12096; JP 221093; WO 87/06713, 19871100; WO 92/08952, 19920500; WO 93/09510, 19930500; WO 87/07056, 19871100 and WO 91/05429, incorporated herein by reference, relate to GPS and related technologies.

The following references, incorporated herein by reference, relate to GPS, position sensors, sensor data analysis, and associated technologies:

"Fuzzy Logic Simplifies Complex Control Problems", Tom Williams, Computer Design, Mar. 1, 1991.

"Methods for Performance Evaluation of Coordinate Measuring Machines, ANSI/ASME B89.1.12M-1985," An American National Standard, published by The American Society of Mechanical Engineers, USA, 1985.

"Neural Network And Fuzzy Systems—A Dynamical Systems Approach To Machine Intelligence", Bart Kosko; Prentice Hall 1992; Englewood Cliffs, N.J.; pp. 13, 18, 19.

"New Airbuses to Use Laser Inertial Reference Systems for Navigation," Litton Systems, Aircraft Engineering, pp. 10-11, June 1983.

"Reasoning For Interpreting Sensor Data," P. J. Braspenning, International Conference Intelligent Autonomous Vehicles, Amsterdam, 1986.

"Sensor Failure Detection Using a Hybrid Analytical/Intelligent Algorithm," George Vachstevanos, International Conference Intelligent Autonomous Vehciles, Amsterdam, 1986. "An/PRC-112 Multi-Mission Transceiver", published by Motorola, Inc., Communications Division, Copyright 1991.

"Combat Rescue. One Pass is All You Get. With PLS, One Pass is All You Need. PLS (Personnel Locator System)", published jointly by Cubic Defense Systems and Motorola, Inc., publication date unknown.

"Artificial intelligence in the control and operation of construction plant—the autonomous robot excavator" published 1993.

"Automation and Robotics in Construction"—vol. 1 by FHG (9 pgs.) believed to have been published on or about June 1991.

"Backhoe Monitor" by IHC-3 Pgs.—Publication date unknown but believed to be prior to one year before the filing date.

Ashjaee, J., et al., "Precise Positioning Using a 4-Channel C/A Code GPS Receiver," IEEE pp. 236-244, 1984.

Auch, W., et al., "Fibre Optic Gyroscope," 1984.

B. Krogh et al., "Integrated Path Planning and Dynamic Steering Control for Autonomous Vehicles," 1986.

Brockstein, A., "GPS-Kalman-Augmented Inertial Navigation System Performance," Naecom '76 Record, pp. 864-868, 1976.

Brodie, K., et al., Performance Analysis of Integrated Navigation Systems, computer applications software technology, no date.

Brooks, R., "Solving the Fine-Path Problem by Good Representation of Free Space," IEEE Transactions on Systems, Man, and Cybernetics, pp. 190-197, March-April, 1983.

Brown, R., "Kalman Filtering Study Guide—A Guided Tour," Iowa State University, pp. 1-19, 1984.

Brown, R., Random Signal Analysis & Kalman Filtering, Chapter 5, pp. 181-209, no date.

Bundorf, R. "The Influence of Vehicle Design Parameters on Characteristic Speed and Understeer," January 1967.

C. McGillem et al., "Infra-Red Location System for Navigation of Autonomous Vehicles," IEEE, pp. 1236-1238, 1988.

Canny, J., "A Computational Approach to Edge Detection," pp. 184-203, 1985.

Culshaw, B., et al., "Fibre Optic Gyroscopes In Inertial Navigation," no date.

D. Daniel et al., "Kinematics and Open-loop Control of an Ilonator-Based Mobile Platform," pp. 346-351 1985.

D. Feng, "Satisficing Feedback Strategies for Local Navigation of Autonomous Mobile Robots," May 5, 1989.

D. Kriegman et al., "Generic Models for Robot Navigation," pp. 746-751, 1988.

D. Kuan et al., "Model-based Geometric Reasoning for Autonomous Road Following," pp. 416-423, 1987.

D. Kuan, "Autonomous Robotic Vehicle Road Following," IEEE Transactions on Pattern Analysis and Machine Intelligence, pp. 647-658, 1988.

D. Rogers et al., Mathematical Elements for Computer Graphics, pp. 144-155, Dec. 8, 1989.

D. Touretzky et al., "What's Hidden in the Hidden Layers?," Byte, pp. 227-233, August 1989.

Data Fusion in Pathfinder and Travtek, Roy Sumner, VNIS '91 conference, October 20-23, Dearborn, Mich.

Database Accuracy Effects on Vehicle Positioning as Measured by the Certainty Factor, R. Borcherts, C. Collier, E. Koch, R. Bennet, VNIS '91 conference from October 20-23, Dearborn, Mich.

Daum, F., et al., "Decoupled Kalman Filters for Phased Array Radar Tracking," IEEE Transactions on Automatic Control, pp. 269-283, March 1983.

Denavit, J. et al., "A Kinematic Notation for Lower-Pair Mechanisms Bases on Matrices," pp. 215-221, June, 1955.

Dickmanns, E. et al., "Guiding Land Vehicles Along Roadways by Computer Vision", The Tools for Tomorrow, Oct. 23, 1985.

Dickmans, E., "Vehicle Guidance by Computer Vision," no date.

Divakaruni, S., et al., "Fast Reaction and High Reliability of Strapdown Navigation Systems Using Ring Laser Gyros," IEEE pp. 315-322, 1984.

E. Dickmanns et al., "A Curvature-based Scheme for Improving Road Vehicle Guidance by Computer Vision," SPIE's Cambridge Symposium on Optical and Optoelectronic Engineering, October 1986.

E. Udd, "Fiberoptic v. Ring Laser Gyros: An Assessment of the Technology," Laser Focus/Electro-Optics, pp. 64-74, December 1985.

Edward J. Krakiwsky, "A Kalman Filter for Integrating Dead Reckoning, Map Matching and GPS Positioning", IEEE Plans '88 Position Location and Navigation Symposium Record, Kissemee, Fla. USA, 29 Nov. 2-Dec. 1988, pp. 39-46.

Euler, W., et al., "A Perspective on Civil Use of GPS, The Institute of Navigation, 36th Annual Meeting, pp. 1-7, 1980.

Fusion of Multisensor Data, John M. Richardson, Kenneth A. Marsh; International Journal of Robotics Research; vol. 7, no. 6; December 1988; pp. 78-87.

Fuzzy Systems and Applications, United Signals and Systems, Inc., Bart Kosko with Fred Watkins, Jun. 5-7, 1991.

G. Geier, et al., "Design of an Integrated Navigation System for Robotic Vehicle Application," Journal of the Institute of Navigation.

G. Wilfong, "Motion Planning for an Autonomous Vehicle," AT&T Bell Laboratories, pp. 529-533, 1988.

GPS Technology and Opportunities, Clyde Harris and Roy Sikorski Expo Comm China '92, Beijing, China, Oct. 30-Nov. 4, 1992.

GPS World, News and Applications of the Global Positioning System, March/April 1990. GPS-90 Tutorials, The Institute of Navigation, Sep. 17-18, 1990, pp. 1-28.

Greenspan, R., et al. "Accuracy of Relative Positioning by Interferometry with Reconstructed Carrier CPS: Experimental Results," Third International Symposium on Satellite Doppler Positioning, pp. 1-19, February 1982.

H. Hatwal et al., "Some Inverse Solutions to an Automobile Path-tracking Problem with Input Control of Steering and Brakes," Vehicle System Dynamics, pp. 61-71, 1986.

H. Nasr et al., "Landmark Recognition for Autonomous Mobile Robots," pp. 1218-1223, 1988.

H. Nii, "Blackboard Application Systems, Blackboard Systems from a Knowledge Engineering Perspective," The AI Magazine, pp. 82-89, August 1986.

H. Nii, "Blackboard Systems: The Blackboard Model Problem-solving and the Evolution of Blackboard Architectures," The AI Magazine, pp. 38-53, Summer 1986.

H. Wunsche, "Detection and Control of Mobile Robot Motion by Real-Time Computer Vision," Mobile Robots, pp. 100-104, 1986.

H. Yamazaki et al., "Autonomous Land Vehicle Using Millimeter Wave Sensing Systems," Proceedings of the 5th International Symposium on Robotics in Construction, June 1988.

Hiroshige et al., "Error Analysis of Electronic Roll Stabilization for Electronically Scanned Antennas", IEEE 1991 pp. 71-75.

I. Cox, "Blanche: An Autonomous Robot Vehicle for Structured Environments," AT&T Bell Laboratories, pp. 978-982, 1988.

IEEE Communications Magazine, vol. 26, No. 7, July 1988 (New York) P. Enge et al. "Differential operation of global positioning system" pp. 48-59.

IEEE Journal of Robotics & Automation, vol. 4, No. 3, June 1988, IEEE (New York), C. Isik et al. "Pilot Level of a Hierarchical Controller for an Unmanned Mobile Robot", pp. 241-255.

IEEE Journal of Robotics & Automation, vol. 4, No. 4, August 1988, IEEE (New York) J. LeM "Domain-dependent reasoning for visual navigation of roadways, pp. 419-427 (Nissan) Mar. 24, 1988.

IEEE Plans '86 Position Location and Navigation Symposium, November 1986, S. Bose: "GPS/PLRS aided inertial land navigation system performance", pp. 496-504.

IEEE Plans '86 Position Location and Navigation Symposium. November 1986, S. Bose: "GPS/PLRS aided inertial land navigation system performance", pp. 496-504.

IEEE Plans '90 Position Location and Navigation Sympoium, Las Vegas, Mar. 20-23, 1990, IEEE New York, N.Y., US. Hunter et al: 'Vehicle navigation using differential GPS'n, pp. 392-398.

IEEE Proceedings, vol. 77, No. 11, Nov. 11, 1989, L. Schuchman et al.: "Applicability of an augmentated GPS for navigation in the National Airspace system", pp. 1709-1727, 1713, 1717, FIGS. 1-8.

IEEE Transactions on Pattern Analysis, vol. 10, No. 5 September 1988, IEEE (New York), D. Kuan et al., "Autonomous robotic vehicle road following" pp. 648-658.

Iijima, J., et al., "A Locomotion Control System for Mobile Robots," no date.

Integration of GPS and Dead Reckoning Navigation Systems, Wei-Wen Kao, VNIS '91 conference from October 20-23, Dearborn, Mich.

J. Borenstein et al., "The Vector Field Histogram-Fast Obstacle Avoidance for Mobile Robots," IEEE Journal of Robotics and Automation, July 1989.

J. Collins, "GPS Equipment Survey, GPS-What does it all mean?," P.O.B., June-July 1987 pp. 12-22.

J. Crowley, "Asynchronous Control of Orientation and Displacement in a Robot Vehicle," pp. 1277-1288, 1989.

J. Crowley, "Part 3: Knowledge Based Supervision of Robotics Systems," 1989 IEEE Conference on Robotics and Automation, pp. 37-42, 1989.

J. Dixon, "Linear and Non-linear Steady State Vehicle Handling," Proceedings of the Institute of Mechanical Engineers, pp. 173-186, 1988.

J. Nielson, et al. "GPS Aided Inertial Navigation," IEEE AES Magazine, pp. 20-26, March 1986.

J. Oliver et al., "A Navigation Algorithm for an Intelligent Vehicle with a Laser Rangefinder," pp. 1145-1150, 1986.

J. Sennott et al., "Study of Differential Processing and Kalman Filtering of Bay Saint Louis Test Data, Ch 1-5, 1987.

Jacob, T., Integrated Navigation System for Approach Guidance for Regional Air-Traffic Using GPS, no date.

Johnson, C. "In-Flight Transfer Alignment/Calibration of a Strapdown INS that Employs Carouseled Instruments and IMV Indexing," no date.

Jorgensen, "18-Satellite Constellations," pp. 9-12, 1980.

Kaczmarek, K. W., "Cellular Networking: A Carrier's Perspective", 39th IEEE Vehicular Technology Conference, May 1, 1989, vol. 1, pp. 1-6.

Kanayama, Y., et al., "A Vehicle Control Architecture-Smooth Driver," Stanford University, no date.

Kanayama, Y., et al., "Trajectory Generation for Mobile Robots," no date. Kao, M., et al., "Multiconfiguration Kalman Filter Design for High-Performance GPS Navigation," IEEE Transactions on Automatic Control, pp. 304-314, March 1983.

Khatib, O., "Real-time Obstacle Avoidance for Manipulators and Mobile Robots", pp. 500-505, 1985.

Knowledge Representation in Fuzzy Logic, Lotfi A. Zadeh, IEEE Transactions on Knowledge and Data Engineering, vol. 1, No. 1, March 1989.

Kowalski et al., "Music Algorithm Implementation for Shipboard HF Radio Direction Finding", IEEE, 1991, pp. 0943-0947.

Kuritsky, M., et al., "Inertial Navigation," Proceedings of the IEEE, pp. 1156-1176, October 1983.

L. Matthies et al., "Integration of Sonar and Stereo Range Data Using a Grid-based Representation," Computer Science Department and Robotics Institute, Carnegie-Mellon University, pp. 727-733, 1988.

Lerner, E., "Gyros in Business Aircraft," Aerospace America, pp. 66-69, October 1984. Lozano-Perez, T., et al., "An Algorithm for Planning Collision-free Paths among Polyhedral Obstacles," Communications of the ACN, pp. 560-570, October 1979.

Luh, J., et al., "Resolved-acceleration Control of Mechanical Manipulators," IEEE Transactions on Automatic Control, pp. 468-475, June 1980.

M. Dailey et al., "Autonomous Cross-Country Navigation with the ALV," Hughes Artificial Intelligence Center, pp. 718-726, 1988.

M. Grewal et al., "Application of Kalman Filtering to the Calibration and Alignment of Inertial Navigation Systems," IEEE, pp. 65-72, 1986.

MacAdam, C., "Application of an Optimal Preview Control for Simulation of Closed-Loop Automobile Driving," IEEE Transactions on Systems, Man, and Cybernetics, pp. 393-399, June 1981.

Martin, E., "Aiding GPS Navigation Functions," Naecom '76 Record, pp. 849-856, 1976. Mueller, C., et al., "Laser Gyro Land Navigation System Performance Predictions and Field Results," IEEE, 1984.

Navigation "Surveys" Summer, 1984, vol. 31, #2, by P. F. MacDoran et al. Navigation Journal of The Institute of Navigation, vol. 32, No. 4, Winter, 1985-86, Printed in U.S.A., "Terrestrial Evaluation of the GPS Standard Positioning Service": by Francis W. Mooney.

Navigation Journal of the Institute of Navigation, vol. 33, No. 4, Winter, 1986-87, Printed in U.S.A., "DiffStar: A Concept for Differential GPS in Northern Norway", by Hermod Fjereide.

Navigation Journal of the Institute of Navigation, vol. 36, No. 3, Fall, 1989, Printed in U.S.A., "Loran-C Vehicle Tracking in Detroit's Public Safety Dispatch System", by Laurence J. Cortland.

Navstar GPS Space Segment/Navigation User Interface, Rockwell International Corporation, Nov. 30, 1987.

Nedley, A., et al., "A New Laboratory Facility for Measuring Vehicle Parameters Affecting Understeer and Brakesteer," pp. 1-20, Jun. 2, 1972.

Nitao, J., et al., "A Pilot for a Robotic Vehicle System," pp. 951-955, no date. Orin, D., "Supervisory Control of a Multi-legged Robot," The International Journal of Robotics Research, pp. 79-91, Spring 1982.

P. Muir, et al. "Kinematic Modeling for Feedback Control of an Omnidirectional Wheeled Mobile Robot," pp. 1772-1778, 1987.

Parkinson, B., et al., "NAVSTAR: Global Positioning System—Ten Years Later," Proceedings of the IEEE, pp. 1178-1186, 1983.

Patent Abstract of Japan, vol. 12, No. 290 (p. 742) Aug. 8, 1988 & JPA 63066479 (Nissan) Mar. 24, 1988.

Patent Abstract of Japan, vol. 13, No. 306 (p. 897) Jul. 13, 1989 & JPA 1079679 (Toyota) Mar. 24, 1989.

Patent Abstract of Japan, vol. 13, No. 306 (p. 897) Jul. 7, 1989 & JPA 1079679 (Toyota) Mar. 24, 1989.

Proceeding PR '88, The Computer Society Conference on Computer Vision & Pattern Recognition, Jun. 5-9, 1988 (Ann Arbor) S. Dickinson et al., "An expert vision system for Autonomous Land Vehicle Road Following", pp. 826-831.

Proceedings 1987 IEEE Conference Mar. 31-Apr. 3, 1987, vol. 2, L. Conway et al.: "Teleautonomous systems: Methods & Architectures for Intermingling autonomous & Telerobotic Technology" pp. 1121 1130.

Proceedings 1987 IEEE International Conference on Robotics & Automation, Mar. 31-Apr. 3, 1987. (Raleigh, N.C.), sponsored by IEEE Council on Robotics & Automation, vol. 3, D. McMenthon, "A zero-bank algorithm for Inverse Perspective of a Road from Single Image, pp. 1444-1449.

Proceedings of 1988 IEEE International Conference on Robotics & Automation, vol. 2, Apr. 24-29, 1988, Philadelphia, IEEE Computer Soc. Press (Washington D.C.), L. E. Banta: "A self turning navigation algorithm", pp. 1313-1314.

Proceedings of the IEEE-F Communications, Radar and Signal Processing, vol. 127, No. 2 Apr. 1980, Stevenage, GB. Blair et al: receivers for the NAVSTAR global positioning system, pp. 163-167.

Product Announcement, "Measurement Methods-Coordinate Measuring Specialists," published by Measurement Methods, Baltimore, Md., USA, publication date unknown. Product Brochure entitled "KOBA-Step Precision Step Gauge," published by Kolb & Baumann GmbH & Co., Germany, 1992.

Product Brochure, "Mobile Calibration Station Utilizing Surveillance Masters," published by Glastonbury Gage, USA, publication date unknown.

R. Cox et al., "Design for Maintainability: Litton's New Family of RLG Inertial Navigation Systems," IEEE, pp. 115-119, 1986.

R. Dork, "Satellite Navigation Systems for Land Vehicles," IEEE AES Magazine, pp. 2-5, May 1987.

R. Dunlay, "Obstacle Avoidance Perception Processing for the Autonomous Land Vehicle," pp. 912-917, 1988.

R. Majure et al., "Comparison of Laser Gyro IMU Configurations for Reentry Systems," IEEE, pp. 96-100, 1986.

Randolph Hartman, "Integrated Laser Inertial/GPS Navigation (GPIRS), "Publication of Honeywell Inc., February, 1990, from a presentation of the Royal Institute of Navigation NAV '89" Satellite Navigation Conference, October, 1989.

Raol, J., et al., "On the Orbit Determination Problem," IEEE Transactions on Aerospace and Electronic Systems, pp. 274-290, May 1985.

Richardson, Rick, "Standards try to help-but don't always agree," Quality Magazine, USA, publication date unknown.

S. Divakaruni et al., "Ring Laser Gyro Inertial and GPS Integrated Navigation System for Commercial Aviation," IEEE, pp. 73-80, 1986.

Sakai, H., "Theoretical and Experimental Studies on the Dynamic Properties of Tyres Part I: Review of Rubber Friction," International Journal of Vehicle Design, pp. 78-110, 1981.

Sakai, H., "Theoretical and Experimental Studies on the Dynamic Properties of Tyres, Part II: Experimental Investigation of Rubber Friction and Deformation of a Tyre," International Journal of Vehicle Design, pp. 182-226, 1981.

Sakai, H., "Theoretical and Experimental Studies on the Dynamic Properties of Tyres, Part III: Calculation of the Six Components of Force and Moment of Tyre," International Journal of Vehicle Design, pp. 335-372, 1981.

Savkoor, A. R., "The Lateral Flexibility of Pneumatic Tyre and Its Application to the Lateral Rolling Contact Problem," pp. 367-381, no date.

Schwartz, H., "Sensitivity Analysis of an Integrated Navstar GPS/INS Navigation System to Component Failure," Journal of the Institute of Navigation, vol. 3, No. 4, pp. 325-337, 1983.

Sennott, J. W., "Experimental Measurement and Characterization of Ionospheric Multipath Errors In Differential GPS", no date.

Sennott, J., "Real-Time GPS and Loran-C Dynamical Performance for Critical Marine Applications," IEEE, pp. 1006-1009, 1981.

Sennott, J., et al., "A Queuing Model for Analysis of A Bursty Multiple-Access Communication Channel," IEEE, pp. 317-321, 1981.

Sheridan, T. "Three Models of Preview Control," IEEE Transactions on Human Factors in Electronics, pp. 91-102, June 1966.

Sheth, P., et al., "A Generalized Symbolic Notation for Mechanism," Transactions of the ASME, pp. 102-112, February 1971.

Sorenson, W., "Least-Squares estimation: From Gauss to Kalman," IEEE Spectrum, pp. 63-68, July 1970.

T. Graettinger et al., "Evaluation and Time-Scaling of Trajectories for Wheeled Mobile Robots," ASME Journal of Dynamic Systems, Nov. 25, 1987.

Taylor, Benjamin R., "CMM accuracy measurements," Quality Magazine, USA, 1986.

Upadhyay, T., et al., "Benefits on Integrating GPS and Inertial Navigation," pp. 1-13, June 1982.

Vaurus, J., "A Stimulation of an Imbedded Software System for Global Positioning System Navigation," Proceedings of the 1985 Winter Simulation Conference, pp. 586-590, 1985. Vehicle Dynamics Terminology, SAE J670e, 1984.

VNIS '89 Conference Record, Sep. 11-13, 1989, Toronto, Canada, T. Saito et al. "Automobile Navigation System Using Beacon Information" pp. 139-145.

W. Nelson, "Continuous Steering-Function Control of Robot Carts," AT&T Bell Laboratories, April 1988.

W. Nelson, et al., "Local Path Control for an Autonomous Vehicle," AT&T Bell Laboratories, pp. 1504-1510, 1988.

W. Uttal, "Teleoperators," Scientific American, pp. 124-129, December 1989.

Wareby, Jan, "Intelligent Signaling: FAR & SS7", Cellular Business, pp. 58, 60 and 62, July 1990.

Wescon/87 Conference Record, vol. 31, 1987, (Los Angeles, US) M. T. Allison et al "The next generation navigation system", pp. 941-947.

Y. Goto et al., "The CMU System for Mobile Robot Navigation," The Robotics Institutes, Carnegie-Mellon University, pp. 99-105, 1987.

Y. Kanayama et al., "A Locomotion Control Method for Autonomous Vehicles," pp. 1315-1317, 1988.

Y. Kanayama et al., "Smooth Local Path-Planning for Autonomous Vehicles," Center for Robotic Systems and Microelectronics, University of California at Santa Barbara, Mar. 7, 1988.

Yamada et al "GPS Navigator," Japanese Radio Technical Bulletin No. 24, 1986.

SUMMARY OF THE INVENTION

The present invention provides a mobile telecommunications device having a position detector, which may be absolute, relative or other type, a memory for storing events in conjunction with locations, and a transmitter or receiver for communicating information stored or to be stored in the memory.

The aforementioned references, each incorporated by reference, relate to methods and apparatus which may be used as part of, or in conjunction with the present invention. Therefore, it is understood that the present invention may integrate other systems, or be integrated in other systems, having complementary, synergistic or related in some way. For example, common sensors, antennas, processors, memory, communications hardware, subsystems and the like may provide a basis for combination, even if the functions are separate.

The position detector is preferably a GPS or combined GPS-GLONASS receiver, although a cellular telephone position detection system (e.g., Enhanced 911 type system) may also be employed. According to aspects of the present invention, a positional accuracy tolerance of 100 up to 1000 meters may be acceptable, achievable with either type system. However, for such purposes as pothole reporting, positional accuracies of 1 to 3 meters are preferred. These may be obtained through a combination of techniques, and therefore the inherent accuracy of any one technique need not meet the overall system requirement.

The position detector may also be linked to a mapping system and possibly a dead reckoning system, in order to pinpoint a position with a geographic landmark. Thus, while precise absolute coordinate measurements of position may be used, it may also be possible to obtain useful data at reduced cost by applying certain presumptions to available data. In an automotive system, steering angle, compass direction, and wheel revolution information may be available, thereby giving a rough indication of position from a known starting point. When this information is applied to a mapping system, a relatively precise position may be estimated. Therefore, the required precision of another positioning system used in conjunction need not be high, in order to provide high reliability position information. For example, where it is desired to map potholes, positional accuracy of 10 cm may be desired, far more precise than might be available from a normal GPS receiver mounted in a moving automobile. However, when combined with other data, location and identification of such events is possible. Further, while the system may include or tolerate inaccuracies, it is generally desired that the system have high precision, as compensation for inaccuracies may be applied.

The system provides a memory for storing events and respective locations. Preferably, further information is also stored, such as a time of the event, its character or nature, and other quantitative or qualitative aspects of the information or its source and/or conditions of acquisition. This memory may be a solid state memory or module, rotating magnetic and/or optical memory devices, or other known types of memory.

The events to be stored may be detected locally, such as through a detector for radar and/or laser emission source, radio scanner, traffic or road conditions (mechanical vehicle sensors, visual and/or infrared imaging, radar or LIDAR analysis, acoustic sensors, or the like), places of interest which may be selectively identified, itinerary stops, and/or fixed locations. The events may also be provided by a remote transmitter, with no local event detection. Therefore, while means for identifying events having associated locations is a part of the system as a whole, such means need not be included in every apparatus embodying the invention.

Radar detectors typically are employed to detect operating emitters of X (10.5 GHz), K (25 GHz) and Ka (35 GHz) radar emissions from traffic control devices or law enforcement personnel for detecting vehicle speed by the Doppler effect. These systems typically operate as superheterodyne receivers which sweep one or more bands, and detect a wave having an energy significantly above background. As such, these types of devices are subject to numerous sources of interference, accidental, intentional, and incidental. A known system, Safety Warning System (SWS) licensed by Safety Warning System L.C., Englewood Fla., makes use of such radar detectors to specifically warn motorists of identified road hazards. In this case, one of a set of particular signals is modulated within a radar band by a transmitter operated near the roadway. The receiver decodes the transmission and warns the driver of the hazard.

LIDAR devices emit an infrared laser signal, which is then reflected off a moving vehicle and analyzed for delay, which relates to distance. Through successive measurements, a sped can be calculated. A LIDAR detector therefore seeks to detect the characteristic pulsatile infrared energy.

Police radios employ certain restricted frequencies, and in some cases, police vehicles continuously transmit a signal. While certain laws restrict interception of messages sent on police bands, it is believed that the mere detection and localization of a carrier wave is not and may not be legally restricted. These radios tend to operate below 800 MHz, and thus a receiver may employ standard radio technologies.

Potholes and other road obstructions and defects have two characteristics. First, they adversely effect vehicles which encounter them. Second, they often cause a secondary effect of motorists seeking to avoid a direct encounter or damage, by slowing or executing an evasive maneuver. These obstructions may therefore be detected in three ways; first, by analyzing the suspension of the vehicle for unusual shocks indicative of such vents; second, by analyzing speed and steering patterns of the subject vehicle and possibly surrounding vehicles; and third, by a visual, ultrasonic, or other direct sensor for detecting the pothole or other obstruction. Such direct sensors are known; however, their effectiveness is limited, and therefore an advance mapping of such potholes and other road obstructions greatly facilitates avoiding vehicle damage and executing unsafe or emergency evasive maneuvers. An advance mapping may also be useful in remediating such road hazards, as well.

Traffic jams occur for a variety of reasons. Typically, the road carries traffic above a threshold, and for some reason the normal traffic flow patterns are disrupted. Therefore, there is a dramatic slowdown in the average vehicle speed, and a reduced throughput. Because of the reduced throughput, even after the cause of the disruption has abated, the roadways may take minutes to hours to return to normal. Therefore, it is typically desired to have advance warnings of disruptions, which include accidents, icing, rain, sun glare, lane closures, road debris, police action, exits and entrances, and the like, in order to allow the driver to avoid the involved region or plan accordingly. Abnormal traffic patterns may be detected by comparing a vehicle speed to the speed limit or a historical average speed, by a visual evaluation of traffic conditions, or by broadcast road advisories. High traffic conditions are associated with braking of traffic, which in turn results in deceleration and the illumination of brake lights. Brake lights may be determined by both the specific level of illumination and the center brake light, which is not normally illuminated. Deceleration may be detected by an optical, radar or LIDAR sensor for detecting the speed and/or acceleration state of nearby vehicles.

While a preferred embodiment of the present invention employs one or more sensors, broadcast advisories, including those from systems according to or compatible with the present invention, provide a valuable source of information relating to road conditions and information of interest at a particular location. Therefore, the sensors need not form a part of the core system. Further, some or all of the required sensors may be integrated with the vehicle electronics ("vetronics"), and therefore the sensors may be provided separately or as options. It is therefore an aspect of an embodiment of the invention to integrate the transceiver, and event database into a vetronics system, preferably using a digital vetronics data bus to communicate with existing systems, such as speed sensors, antilock brake sensors, cruise control, automatic traction system, suspension, engine, transmission, and other vehicle systems.

The radio used for the communications subsystem can be radio frequency AM, FM, spread spectrum, microwave, light (infrared, visible, UV) or laser or maser beam (millimeter wave, infrared, visible), or for short distance communications, acoustic or other communications may be employed. The system preferably employs an intelligent transportation system (ITS) or Industrial, Scientific and Medical (ISM) allocated band, such as the 915 MHz, 2.4 MHz or 5.8 GHz band. (The 2.350-2.450 GHz band corresponds to the emission of microwave ovens, and thus the band suffers from potentially significant interference). The 24.125 GHz band, corresponding to K-band police radar, may also be available; however, transmit power in this band is restricted, e.g., less than about 9 mW. The signal may be transmitted through free space or in paths including fiber optics, waveguides, cables or the like. The communication may be short or medium range omnidirectional, line of sight, reflected (optical, radio frequency, retroreflector designs), satellite, secure or non-secure, or other modes of communications between two points, that the application or state-of-the-art may allow. The particular communications methodology is not critical to the invention, although a preferred embodiment employs a spread spectrum microwave transmission.

A number of Dedicated Short Range Communications (DSRC) systems have been proposed or implemented in order to provide communications between vehicles and roadside systems. These DSRC systems traditionally operate in the 900 MHz band for toll collection, while the FCC has recently made available 75 MHz in the 5.850-5.925 GHz range for such purposes, on a co-primary basis with microwave communications, satellite uplinks, government radar, and other uses. However, spectrum is also available in the so-called U-NII band, which encompasses 5.15-5.25 GHz (indoors, 50 mW) and 5.25-5.35 (outdoors, 250 mW). At such frequencies, the preferred semiconductor technology for the radiofrequency circuits is Silicon Germanium, available as a biCMOS heterojunction bipolar transistor process from IBM (CommQuest Technologies Division). Gallium Arsenide processes may also operate in this band. Silicon processes are preferred in the 900 MHz band and below.

A Japanese ITS ("ETC") proposal provides a 5.8 GHz full duplex interrogation system with a half duplex transponder, operating at about 1 megabit per second transmission rates.

It is noted that the present technology has the capability for streamlining transportation systems, by communicating traffic conditions almost immediately and quickly allowing decisions to be made by drivers to minimize congestion and avoid unnecessary slowdowns. A particular result of the implementation of this technology will be a reduction in vehicular air pollution, as a result of reduced traffic jams and other inefficient driving patterns. To further the environmental protection aspect of the invention, integration of the database with cruise control and driver information systems may reduce inefficient vehicle speed fluctuations, by communicating to the driver or controlling the vehicle at an efficient speed. As a part of this system, therefore, adaptive speed limits and intelligent traffic flow control devices may be provided. For example, there is no need for fixed time traffic lights if the intersection is monitored for actual traffic conditions. By providing intervehicle communications and identification, such an intelligent system is easier to implement. Likewise, the 55 miles per hour speed limit that was initially presented in light of the "oil crisis" in the 1970's, and parts of which persist today even in light of relatively low petroleum pricing and evidence that the alleged secondary health and safety benefit is marginal or non-existent, may be eliminated in favor of a system which employs intelligence to optimize the traffic flow patterns based on actual existing conditions, rather than a static set of rules which are applied universally and without intelligence.

The communications device may be a transmitter, receiver or transceiver, transmitting event information, storing received event information, or exchanging event information, respectively. Thus, while the system as a whole typically involves a propagation of event information between remote databases, each system embodying the invention need not perform all functions.

In a retroreflector design system, signal to noise ratio is improved by spatial specificity, and typically coherent detection. An interrogation signal is emitted, which is modulated and redirected back toward its source, within a relatively wide range, by a receiver. Thus, while the receiver may be "passive", the return signal has a relatively high amplitude (as compared to non-retroreflective designs under comparable conditions) and the interrogator can spatially discriminate and coherently detect the return signal. Both optical and RF retroreflector systems exist.

In a preferred embodiment, the communications device employs an unlicensed band, such as 900 MHz (902-928 MHz), FRS, 49 MHz, 27 MHz, 2.4-2.5 GHz, 5.4 GHz, 5.8 GHz, etc. Further, in order to provide noise immunity and band capacity, spread spectrum RF techniques are preferred.

In one embodiment, communications devices are installed in automobiles. Mobile GPS receivers in the vehicles provide location information to the communications devices. These GPS receivers may be integral or separate from the communications devices. Event detectors, such as police radar and laser (LIDAR) speed detectors, traffic and weather condition detectors, road hazard detectors (pot holes, debris, accidents, ice, mud and rock slides, drunk drivers, etc.), traffic speed detectors (speedometer reading, sensors for detecting speed of other vehicles), speed limits, checkpoints, toll booths, etc., may be provided as inputs to the system, or appropriate sensors integrated therein. The system may also serve as a beacon to good Samaritans, emergency workers and other motorists in the event of accident, disablement, or other status of the host vehicle.

It is noted that at frequencies above about 800 MHz, the transmitter signal may be used as a part of a traffic radar system. Therefore, the transmitted signal may serve both as a communications stream and a sensor emission.

Functions similar to those of the Cadillac (GM) On-Star system may also be implemented, as well as alarm and security systems, garage door opening and "smart home" integration.

The memory stores information describing the event as well as the location of the event. Preferably, the memory is not organized as a matrix of memory addresses corresponding to locations, e.g., a "map", but rather in a record format having explicitly describing the event and location, making storage of the sparse matrix more efficient and facilitating indexing and sorting on various aspects of each data record. Additional information, such as the time of the event, importance of the event, expiration time of the event, source and reliability of the event information, and commercial and/or advertising information associated with the event may be stored. The information in the memory is processed to provide a useful output, which may be a simple alphanumeric, voice (audible) or graphic output or the telecommunications system. In any case, the output is preferably presented in a sorted order according to pertinence, which is a combination of the abstract importance of the event and proximity, with "proximity" weighted higher than "importance". Once a communication or output cycle is initiated, it may continue until the entire memory is output, or include merely output a portion of the contents.

In outputting information directly to a human user, thresholds are preferably applied to limit output to events which are of immediate consequence and apparent importance. For example, if the communications device is installed in a vehicle, and the information in the memory indicates that a pothole, highway obstruction, or police radar "trap" is ahead, the user is informed. Events in the opposite direction (as determined by a path or velocity record extracted from the position detector) are not output, nor are such events far away. On the other hand, events such as road icing, flooding, or the like, are often applicable to all nearby motorists, and are output regardless of direction of travel, unless another communications device with event detector indicates that the event would not affect the local communications device or the vehicle in which it is installed.

The system preferably ages event data intelligently, allowing certain types of events to expire or decrease in importance. A traffic accident event more than 12 hours old is likely stale, and therefore would not be output, and preferably is purged; however, locations which are the site of multiple accidents may be tagged as hazardous, and the hazard event output to the user as appropriate.

A temporal analysis may also be applied to the event data, and therefore diurnal variations and the like accounted for. Examples of this type of data include rush hour traffic, sun glare (adjusted for season, etc.), vacation routes, and the like.

Thus, user outputs are provided based on proximity, importance, and optionally other factors, such as direction, speed (over or under speed limit), time-of-day, date or season (e.g., sun glare), freshness of event recordation, and the like.

In communicating data to another communications device, typically it is desired to transmit (or exchange) all of the memory or all of a "public" portion of the memory, with the received information sorted and processed by the receiving unit and relevant information persistently stored in the memory. After exchange, conflicts may be resolved by a further exchange of information. An error detection and correction (EDC) protocol may be employed, to assure accurate data transmission.

Since the communication bandwidth is necessarily limited, and the communications channels subject to noise and crowding, it is often important to prioritize transmissions. It is noted that, without a complete communication of the memory, it is difficult to determine which events a communications partner is aware of, so that an initial communication may include an identification of the partners as well as recent encounters with other partners, to eliminate redundant communications, where possible. Vehicles traveling in the same direction will often be in close proximity longer than vehicles traveling in opposite directions. Further, the information of relevance to a vehicle traveling in the same direction will differ from the information of relevance to a vehicle traveling in the opposite direction. Thus, in addition to an identification of the communications device, the recent path and proposed path and velocity should also be exchanged. Based on this information, the data is prioritized and sorted, formatted and transmitted. Since the communications channel will likely vary in dependence on distance between partners, the communications protocol may be adaptive, providing increased data rate with decreasing distance, up to the channel capacity. Further, when the vehicles are relatively close, a line-of-sight communications scheme may be implemented, such as infrared (e.g., IRdA), while at larger distances (and/or for all distances) a spread spectrum 915 MHz, 2.4 GHz or 5.825 GHz RF communications scheme implemented.

Where multiple communications devices are present within a common communications region, these may be pooled, allowing transmissions from one transmitter to many receivers. In addition, within a band, multiple channels may be allocated, allowing multiple communications sessions. In this case, a single arbitration and control channel is provided to identify communications devices and communications parameters. Preferably, a communications device has the capability to monitor multiple channels simultaneously, and optionally to transmit on multiple channels simultaneously, where channel congestion is low. The channels are typically frequency division. Where such frequency division channels are defined, communications may be facilitated by so-called "repeaters", which may itself be a mobile transceiver according to the present invention. Preferably, such a repeater unit itself monitors the data stream, and may even process the data stream based on its internal parameters before passing it on.

In order to assure data integrity and optimize data bandwidth, both forward and retrospective error correction are applied. Data is preferably packetized, with each packet including error detection and correction information. Successful receipt of each packet is acknowledged on a reverse channel, optionally interspersed with corresponding data packets traveling in the reverse direction (e.g., full duplex communications). Where the data error rate (raw or corrected) is unacceptably high, one or more "fallback" modes may be implemented, such as reduced data rates, more fault tolerant modulation schemes, and extended error correction and detection codes. Transmitter power may also be modulated within acceptable limits.

A central repository of event data may be provided, such as on the Internet or an on-line database. In this case, event information may be administered remotely, and local storage minimized or eliminated. Communications with the central database may be conducted by cellular telephone, cellular data packet devices (CDPD), PCS, GSM, satellite (Iridium™, etc.) or in other communications bands and other communications schemes.

Alternately, or in addition, the communications device may include a telephone modem (digital to analog modulator-demodulator) for exchanging event information over telephone communications lines. The device according to the present invention may either be plugged into a wall jack, use acoustic coupling (advantageous, for example, for pay-telephones) or communicate wirelessly with a base unit, such as while parked in a garage or service station. Where primary event information storage is remote from the device, preferably local storage is based on an itinerary (route) and frequently traveled areas, with less frequently traveled and not prospectively traveled routes stored remotely. This allows consolidated update of memory by a large number of sources, with statistical error detection and correction of errant event information. The itinerary information may be programmed in conjunction with the GPS system and mapping software.

According to one embodiment of the invention, the functions are integrated into a single device, including police radar and LIDAR detectors, user output, memory, central processor, GPS receiver and RF transceiver. Accessory inputs and outputs may also be provided, including means for alphanumeric, graphic (still or motion) or voice message communication between communications devices. Event information is communicated as packets including full event information as well as error correction and detection codes. The packet size is preferably large enough to minimize the impact of communications protocol overhead while small enough to minimize the efficiency loss resulting from full packet retransmissions. For example, a control channel is provided with 256 bit packets, while a set of regular communications channels is provided with 512 bit packets. Event information may span multiple packets or be consolidated within packets. The data is preferably compressed using a dictionary lookup, run length encoding, and/or model-based vector quantization method. Thus, since transceivers will typically be within 2000 meters from each other, relative position may be relayed in an offset format, with a grid size based on GPS precision and required accuracy, e.g., about 50-100 meters. The encoding may be adaptive, based, for example, on stored map information, with information representation density highest on traveled routes and lower in desolate areas. Thus, a sort of differential-corrected positional coding may be established between units.

By integrating functions, efficiencies are achieved. Thus, a single central processor, memory, program store and user interface will suffice for all functions. Further, the power supply and housing are also consolidated. While GPS and telecommunication antennas will be distinct, other portions of the system may also be integrated. In a device intended for vehicular applications, the GPS and other functions may be available to other vehicular systems, or the required data received from other systems. For example, the Cadillac (GM) On-Star system might supply GPS signals to the communications device according to the present invention, or vice versa.

Communication between communications devices may also employ the cellular telephone network, for example utilizing excess capacity in a local or regional communication mode rather than linked to the public switched telecommunications network (PSTN). Thus, the system may include or encompass a typical cellular (AMPS, IS-136, IS-95, CDPD, PCS and/or GSM) type telecommunications device, or link to an external telecommunications device.

Even where the cellular telephony infrastructure is not involved, mobile hardware may be reused for the present invention. For example, the output of a mobile cellular transceiver may be "upconverted" to, for example, 900 MHz or 2.4 GHz, and retransmitted. While this is somewhat inefficient in terms of power and complexity, it allows use of existing cellular devices (with software reprogramming and data interfacing) in conjunction with a relatively simple upconversion transmitter.

According to the present invention, messages are passed between a network of free roving devices. In order to maintain network integrity, spurious data must be excluded. Thus, in order to prevent a "hacker" or miscreant (e.g., overzealous police official) from intentionally contaminating the dispersed database, or an innocent person from transmitting corrupted data, the ultimate source of event data is recorded. When corrupt or erroneous data is identified, the source is also identified. The corrupting source is then transmitted or identified to the central database, whereupon, units in the field may be programmed to ignore the corrupt unit, or to identify its location as a possible event to be aware of.

Preferably, data is transmitted digitally, and may be encrypted. Encryption codes may be of a public-key/private key variety, with key lookup (e.g., by a cellular telephony or CDPD-type arrangement to a central database) either before each data exchange, or on a global basis with published updates. In fact, corrupt or unauthorized units may be deactivated by normal and authorized units within the network, thus inhibiting "hacking" of the network. Thus, a subscription based system is supported.

Techniques corresponding to the Firewire (IEEE 1394) copy protection scheme may be implemented, and indeed the system according to the present invention may implement or incorporate the IEEE 1394 interface standard. While the event database is generally not intended to be copy-protected, the IEEE 1394 key management scheme may be useful for implementing subscription schemes and for preventing tampering.

One way to subsidize a subscription-based system is through advertising revenue. Therefore, the "events" may also include messages targeted to particular users, either by location, demographics, origin, time, or other factors. Thus, a motel or restaurant might solicit customers who are close by (especially in the evening), or set up transponders along highways at desired locations. Travelers would then receive messages appropriate to time and place. While the user of the system according to the present invention will typically be a frequent motorist or affluent, the system may also provide demographic codes, which allow a customized response to each unit. Since demographic information is personal, and may indicate traveler vulnerability, this information is preferably not transmitted as an open message and is preferably not decodable by unauthorized persons. In fact, the demographic codes may be employed to filter received information, rather than to broadcast interests.

Commercial messages may be stored in memory, and therefore need not be displayed immediately upon receipt. Further, such information may be provided on a so-called "smart card" or PC Card device, with messages triggered by location, perceived events, time and/or other factors. In turn, the presentation of commercial messages may be stored for verification by an auditing agency, thus allowing accounting for advertising fees on an "impression" basis.

The communications device may also receive data through broadcasts, such as using FM sidebands, paging channels, satellite transmission and the like. Thus, locationally or temporally distant information need not be transmitted between mobile units.

While low power or micropower design is desirable, in an automobile environment, typically sufficient power is continuously available to support sophisticated and/or power hungry electronic devices; thus, significant design freedom is provided to implement the present invention using available technologies.

These and other objects will become clear through a review of the drawings and detailed description of the preferred embodiments.

DETAILED DESCRIPTION OF THE PREFERRED EMBODIMENTS

Figure 1:
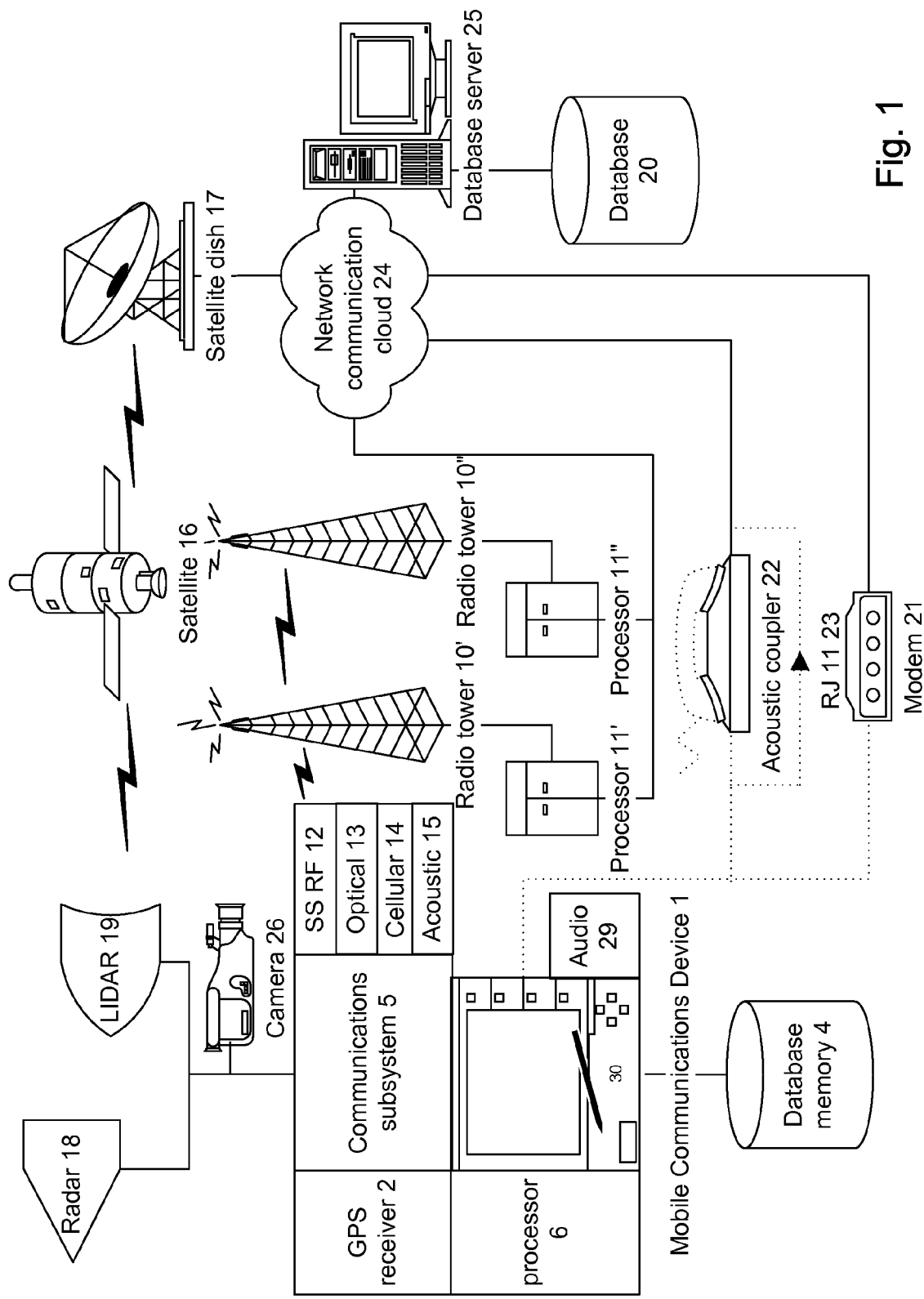
FIG. 1 is a block diagram of a preferred embodiment of a communications system according to the present invention.
Figure 2:
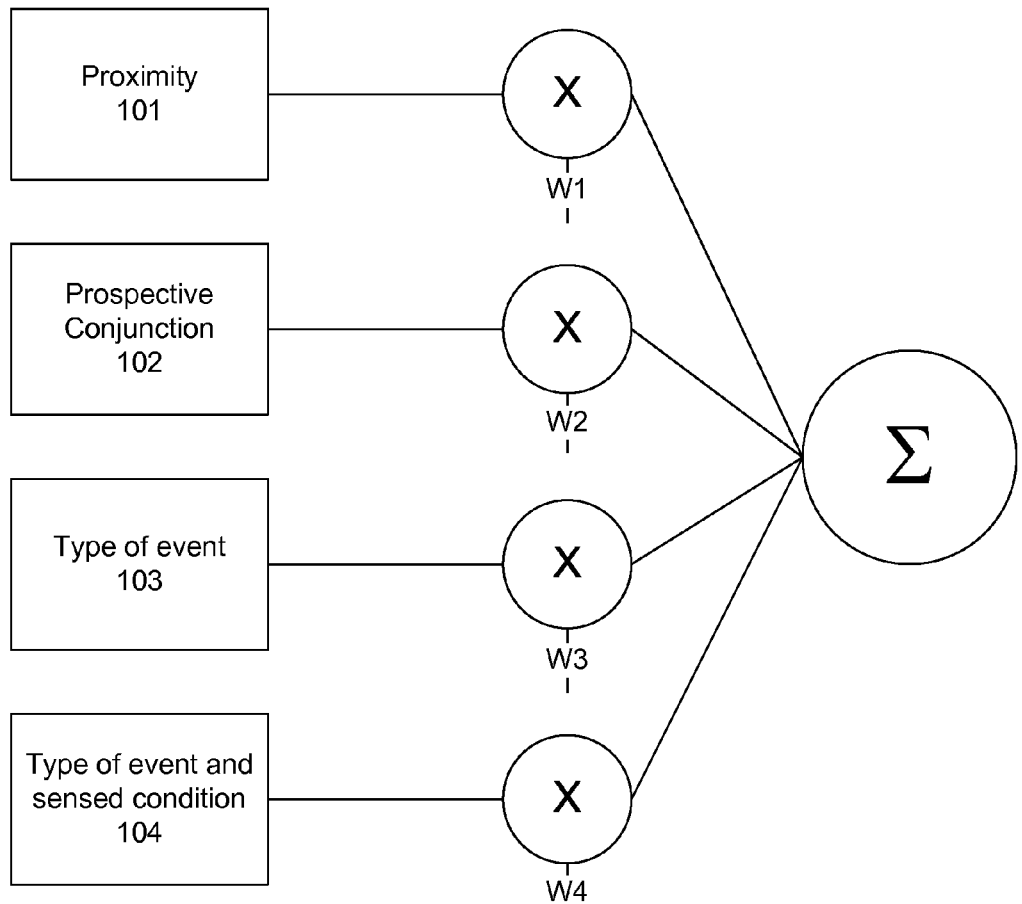
FIG. 2 is a schematic diagram showing the prioritization scheme.
Figure 3:
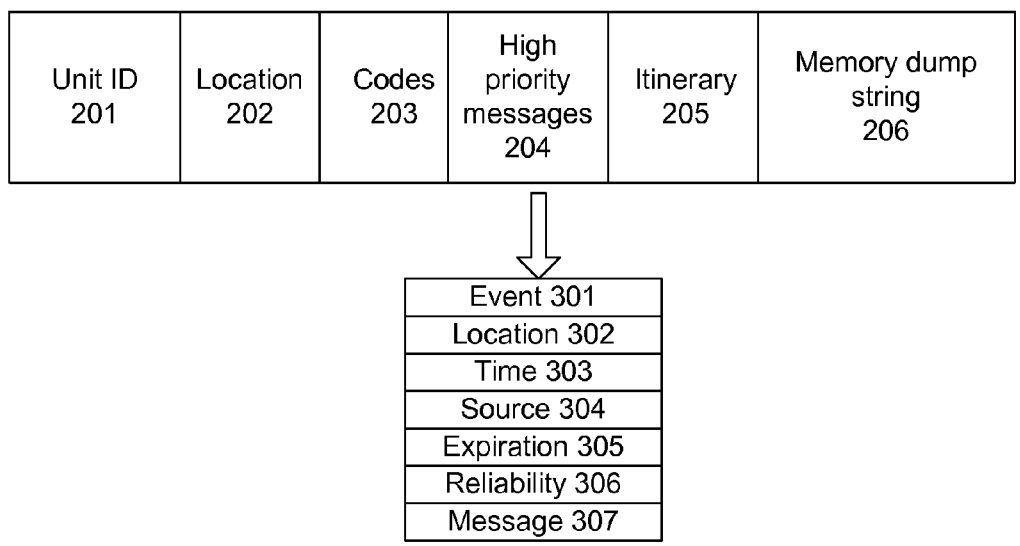
FIG. 3 is a block diagram representing a message format.

FIG. 1 shows a block diagram of an communications device embodiment of the present invention. The mobile communications device 1 includes, as necessary elements, a location sensing system 2, producing a location output 3; a memory 4, storing a set of locations and associated events; a telecommunications subsystem 5, communicating event and location information between a remote system and the memory 4; and a processor 6, processing the location output in conjunction with the stored locations and associated events in the memory 4, to determine a priority thereof.

The location sensing system 2 comprises a known GPS receiver, which produces data that is analyzed by the processor 6. In an alternate embodiment, the GPS receiver includes its own processor and outputs coordinate positions, e.g., Cartesian coordinates, latitude and longitude, to the communications device processor 6, e.g., through a serial port or data bus, such as PC card, Universal serial Bus (USB), Firewire (IEEE 1394), peripheral connect interface (PCI), or other bus, such as that present within an automobile for communication of signals between subsystems. The location sensing system may also determine a position based on the GLONASS system, LORAN, inertial reference, cellular base stations 10', 10", triangulation with fixed radio sources, such as FM radio and television stations, environmental markers and/or transponders, or the like.

The communications subsystem 5 is a 900 MHz digital spread spectrum radio transceiver 12, operating unlicensed according to FCC regulations for this type of equipment. The system may alternately or additionally communicate in other unlicensed bands, such as 27 MHz, 49 MHz, FRS band, 2.4-2.5 GHz, 5.4 GHz, 5.8 GHz using various known modulation schemes and data communication protocols. Further, licensed radio bands may also be used, including FM radio sidebands (88-108 MHz), television PRO channel, cellular telephony channels, DECT, PCS and GSM channels, and the like. Likewise, satellite systems 16, 17 may be used to communicate with the mobile communications device 1. Thus, for example, instead of direct communication between mobile units, the existing cellular telephony 10', 10" infrastructure may be used to provide intercell, local, and/or regional communications between units, controlled by cellular telephone switching processors 11', 11". These communications may be given a lower priority than voice communications on the cellular telephone network, and therefore may use otherwise excess bandwidth, thus allowing reduced costs and reduced user fees or subscription rates. Further, this scheme allows use of existing cellular telephones 14, as or instead of an integrated communications subsystem operating according to a different standard. For example, cellular telephones may be present in the vehicle for voice communications purposes, and therefore simultaneously with a system according to the present invention. In this case, the communications device need only have a data communications transceiver for interfacing with a cellular communication device, e.g., AMPS, IS-95, IS-136, CDPD, DECT, GSM and PCS, and need not integrate the radio frequency communication device components. In a variant embodiment, a cellular-type telephone is controlled to operate outside the (AMPS) cellular telephone channels, in the 900 MHz band. It is noted that existing cellar communications system do not support high bandwidth data communications when using a single channel. On the other hand, the modifications to a digital cellular communications device to allocate a full time division multiplexed (TDM) channel to as single transceiver are theoretically simple, and allow relatively high data rates. Thus, slightly modified transceivers may be employed. Such modified transceivers may also be used for other high bandwidth mobile requirements, such as mobile video-conferencing, and the like.

The memory 4 may be of any standard type, for example, static random access memory, dynamic random access memory, ferroelectric memory, magnetic domain memory (e.g., diskette, hard disk), non-volatile semiconductor memory (e.g., UV-EPROM, EEPROM, Flash, non-standard electrically erasable programmable non-volatile memory), optically readable memory (e.g., R-CDROM, RW-CDROM, R-DVD, etc.), scanning/tunneling micromechanical memory systems, and the like. Preferably, common memory devices, such as 72 or 168 pin dynamic RAM single inline memory modules (SIMMs) are employed, at least for a volatile portion of the memory, allowing simple upgrades and industry standard compatibility.

While the preferred embodiment includes a radio frequency transceiver for transmitting event data and receiving event data, embodiments are also possible which either transmit or receive the relevant data, but not both. For example, regulations may limit certain transmissions or relevant event sensors, e.g., radar detectors in trucks. In these cases, a receive only embodiment may be appropriate. Further, while radio frequency communications are preferred, due to their range, data capacity and availability, optical communications systems 13, e.g., infrared LED's and laser diodes, acoustic communication 15, passive backscatter communications (employing an RF transceiver such as the spread spectrum transceiver 12), and the like may also be employed in conjunction or in substitution of a radio frequency system. Optical communication systems 13 may employ various detectors, including optical homodyne detectors, or other coherent optical detectors, or other types of optical sensors, such as PIDs, CCDs, silicon photodiodes, and the like.

Under some circumstances, a wired link between units may be appropriate. For example, a central database 20 may provide consolidated and reliable data. The relevant portion of the database 20 may be downloaded by telephone through a modem 21, either through a physical connection 23 (e.g., RJ-11 or RJ-12 jack) or through an acoustic coupler 22, through the public switched telephone network, Internet or other network 24, to a database server 25. The memory 4 of the mobile unit may also be uploaded to the central database 20, after processing by the database server 25, during the same connection or session.

Thus, according to the present invention, the public switched telephone network 24 may be involved both during intermittent mass data communications with a central database 20, and also using, for example, cellular telephony 14, for the normal operation of the system (e.g., communications between mobile units).

The processor 6 analyzes the information stored in memory 4 to provide a prioritized output. Thus, the memory may store information relating to a relatively large number of events, without overwhelming the capacity of a human user or communications partner. Priority may be based on a number of factors, including proximity of a stored location to a sensed location or a spatial-temporal proximity of a stored location to a loci of an itinerary 101, a prospective conjunction 102 of a sensed location with a stored location, a type of event 103, a type of event and a sensed condition associated with the mobile communications device 104, or other factors or a combination of factors. Neural networks, fuzzy logic and/or traditional logic paradigms may also be employed to prioritize the outputs. These logical paradigms are provided in known manner, and, especially in the case of neural network-based systems, a training aspect may be supplied with the system to allow it to adapt to the preferences and capabilities of the user. Thus, for a human user, events which are forthcoming and important are output, while past events and those in the distant future, if at all, are low priority. On the other hand, for communications with other devices, the prioritization is primarily in consideration of the fact that the communication between units may be only short lived; therefore, the data is communicated in order to priority, preferably of the recipient device. In an adaptive device, if the user believes that the information from the device is inappropriate, a simple input is provided, which is later analyzed to alter the information presentation algorithm. Likewise, if an information alert retrospectively turns out to be erroneous is a predictable manner, i.e., relating to a route not taken, the system may internally adjust the algorithm without user input.

In order to sort the priorities, the intended recipient may, for example, identify itself 201 and communicate its location 202 an itinerary or intended or prospective path 205. High priority messages 204 and various codes 203 may be interspersed through the communication string. The transmitting unit then outputs data 206 in order of the computed or predicted importance of the event and the time before the recipient encounters the event. Static events, such as fixed location radar emission sources, which may, for example, indicate a source for interference with a radar detector, or a speed detection/control device, may be transmitted as well.

Therefore, it is noted that the present invention provides a means for mapping events and for analyzing their significance. Thus, this embodiment does not merely rely on processed sensor outputs to supply information to the user; rather, sensor outputs may be filtered based on past experience with the particular location in question. If a particular user does not have direct experience with a location, then the experience of others at that location may be substituted or combined to improve analysis of the sensor signal. Therefore, the signal analysis from the sensor need not be subjected to a relatively high threshold to avoid false alarms. A low threshold is acceptable because other information is employed to determine the nature of the physical elements which give rise to the event and sensor activation.

It is noted that, in the case of "false alarms", the response of the unit is to detect the event, e.g., radar signal, correlate it with a stored "false alarm" event, and suppress an alarm or modify the alarm signal. Thus, information stored in memory and/or transmitted between units, may signify an important alarm or a suppression of an erroneous alarm. In this context is apparent that the integrity of the database structure, especially from corruption by the very sources of alarms which are intended to be detected, is important. To the extent that the environment responds to the existence and deployment of the system according to the present invention, for example by detecting transmissions between units to identify and locate units, and thereby alter the nature of an event to be detected, the present system may also be adaptive, in terms of its function and signature spectral patterns. In one aspect, the system may employ a so-called "FLASH" upgradable memory, which controls system, operation. Therefore, periodically, the system operation may be altered. The communications may selectively occur on a plurality of bands, using a plurality of protocols. Thus, for example, the system may have tri-band capability, e.g., 900 MHz, 2.4 GHz and 5.8 GHz. The mapping feature of the present invention may also be used to identify the locations of such monitoring sites. The system may also mask its transmissions as other, more common types of transmissions or environmental sources of emissions. A direct sequence spread spectrum technique maybe employed which is difficult to detect without knowing the spread spectrum sequence seed. Of course, an aspect of the present invention is open communications, which as a matter of course are not securely encrypted and which would identify the transponder and its location. This problem may be addressed, in part, relying on laws which prevent unauthorized eavesdropping and unauthorized interception and decryption of communications, unauthorized "copying" of copyright works and defeating of copy protection schemes thereof, control over availability of authorized transceivers, and patent protection of the design and implementation.

Thus, in a preferred design, all communications are direct sequence spread spectrum over a wide band, with medium to high security codes, e.g., 10 bits or greater length chip sequence and 12 bits or greater data encryption, and more preferably 16 bit or greater chip sequence and 16 bit or greater data encryption. The chip sequence of the control and arbitration channel, which must be available to all compatible units, may be adaptive or changing, for example following a formula based on time, location, and/or an arbitrary authorization code provided with a subscription update. Further, the chip sequence may vary based on selective availability (SA) deviancies in GPS data, or based on the identity of satellites in view of the receiver. While such information might be available to "pirates", miscreants, hackers and scofflaws, the algorithm for generating the chip sequence might be held as confidential, and thus the system unusable without specific authorization and incompatible with equipment without such algorithm. Such systems employing secure encryption with open access have been employed in satellite television (General Instrument VideoCipher II) and the like. It is noted that, in order to mask a message in a spread spectrum signal, multiple active channels may be employed, one or more of which transmits the desired data and the remainder transmitting noise or masking data.

Employing 2.4 or 5.8 GHz communications bands, data rates of 10 megabits per second (MBPS) are possible, although lower rates, such as 0.5-1.0 MBPS may be preferred to reduce loss due to interference or adverse communications conditions and maintain availability of simultaneous communications on multiple channels within the band in a small geographic area.

Where mobile devices are traveling parallel and at similar speeds, or both are stopped, an extended communications session may be initiated. In this case, the data prioritization will be weighted to completely exchange a public portion of the database, although emphasis will still be placed on immediately forthcoming events, if anticipated. On the other hand, where computed or user-input trajectories indicate a likely brief encounter, the immediate past events are weighted most heavily.

In order to analyze temporal relevance, the memory 4 preferably stores an event identifier 301, a location 302, a time of detection of an event 303, a source of the event information 304, an encoding for a likely expiration of the event 305, a reliability indicator for the event 306, and possibly a message associated with the event 307 including other information. These data fields may each be transmitted or received to describe the event, or selectively transmitted based on the nature of the event or an initial exchange between units specifying the information which will be communicated.

For example, in a radar detector embodiment, mobile police radar "traps" are often relocated, so that a particular location of one event should not be perpetuated beyond its anticipated or actual relevance. In this case, expirations may be stored, or calculated based on a "type" of event according to a set of rules. False alarms, due to security systems, traffic control and monitoring systems, and the like, may also be recorded, to increase the reliability any warnings provided.

Likewise, traffic jams often resolve after minutes or hours, and, while certain road regions may be prone to traffic jams, especially at certain hours of the day and/or days of the week, abnormal condition information should not persist indefinitely.

The preferred embodiment according to the present invention provides an event detector, which, in turn is preferably a police radar 18 and LIDAR 19 detector. Other detected events may include speed of vehicle, traffic conditions, weather conditions, road conditions, road debris or potholes, site designation, sources of radio signals or interference or false alarms for other event detectors, and particular vehicles, such as drunk drivers or unmarked police cars (possibly by manual event input). The event detector may include, for example, a sensor, such as a camera 26, which may analyze traffic control indicia (such as speed limits, cautions, traffic lights). The event may also include a commercial message or advertisement, received, for example from a fixed antenna beside a road, which, for example, is stored as the message 307. Such a commercial message 307 may be presented immediately or stored for future output. The received message, whether commercial or not, may be a static or motion graphic image, text or sound message. The user output of the system 27 may thus be visual, such as a graphic or alphanumeric (text) display, indicator lights or LED's 28, audible alerts or spoken voice through an audio transducer 29.

The camera is, for example, a color, monochrome or infrared charge coupled device (CCD) or complementary metal oxide silicon field effect transistor (CMOS) imager, having resolution of CIF (common interchange format), QCIF (quarter common interchange format), NTSC (national television standards committee), PAL (phase-alternate line), or other standard, and preferably images using NTSC format and transmits, if at all, as QCIF. Image communication may be, for example H.261 or H.263, using H.324+ (using mobile communications extensions) or H.323 protocol. The imager may also be incorporated as part of a mobile videoconferencing system, although a dual imager system (one for imaging persons and the other for imaging road conditions) may be implemented. Other ITU standards, e.g., T.120, may be employed for data communications, although the particular nature of the data communications channel(s) may compel other communications protocols.

In order to maintain the integrity of the database stored in memory 4, 20, it may be useful to store the originator of a record, i.e., its source 304. Thus, if event information from that origin is deemed unreliable, all records from that source may be purged, and future messages ignored or "flagged". As stated above, even the proximity of an unreliable or modified unit may be detrimental to system operation. Therefore, where the location of such a unit is known, other units in proximity may enter into a silent mode. Further, normal units may transmit a "kill" message to the unreliable unit, causing it to cease functioning (at least in a transmit mode) until the problem is rectified or the unit reauthorized.

The unit is preferably tamper-proof, for example, codes necessary for unit activation and operation are corrupted or erased if an enclosure to the unit is opened. Thus, techniques such as employed in the General Instrument VideoCipher II and disclosed in Kaish et al., U.S. Pat. No. 4,494,114, may be employed.

The communications subsystem preferably employs an error correction/error detection protocol, with forward error correction and confirmation of received data packet. The scheme may be adaptive to the quality of the communication channel(s), with the packet length, encoding scheme, transmit power, bandwidth allocation, data rate and modulation scheme varied in an adaptive scheme to optimize the communication between units. In many cases, units engaged in communication will exchange information bidirectionally. In that case, a full duplex communication protocol is preferred; on the other hand, where communication is unidirectional, greater data communication rates may be achieved employing the available bandwidth and applying it to the single communication session.

In some instances, it may be desired to maintain privacy of communications. In that case, two possibilities are available; spread spectrum communications, preferably direct sequence spread spectrum communications is employed, to limit eavesdropping possibilities. Second, the data itself may be encrypted, using, for example, a DES, PGP, elliptic keys, or RSA type encryption scheme. Keys may be supplied or exchanged in advance, negotiated between partners, or involve a public key-private key encryption algorithm. For example, the spread spectrum communications chip sequence may be based on an encrypted code.

In order to provide flexibility in financing the communications devices, the commercial messages 307 discussed above may be employed. Further, by circulating authorization tokens or codes 203, a subscription service may be provided. Thus, in a simplest subscription scheme, the communications device has a timer function, which may be a simple clock or GPS referenced. The user must input an authorization code periodically in order for the device to continue operating. Thus, similarly to satellite television receivers and some addressable cable television decoders, failure to provide the authorization code, which may be entered, e.g., by telephone communication or through a keypad 30, renders the device temporarily or permanently inoperative. In order to reduce the burden of reauthorizations, the authorization codes or tokens may be passed through the communications "cloud" 24, so that devices 1, if used, will eventually receive the authorization data. Conversely, a code 203 may be circulated which specifically deactivates a certain device 1, for example for non-payment of the subscription fee or misuse of the device (e.g., in an attempt to corrupt other users databases). The authorization process is preferably integral to the core operation of the system, making bypassing authorization difficult.

Where a number of communications devices are in proximity, a multi-party communication session may be initiated. For example, the communications subsystem may have simultaneous multi-channel capability, allowing each unit to transmit on a separate channel or use a shared channel. Where the number of channels or channel capacity is insufficient, units may take turns transmitting event information on the same channel (e.g., according to estimated priority), or time division multiplex (TDM) the channel(s). Preferably, the communication scheme involves a number of channels within a band, e.g., 1 common control channel and 24 data communications channels. Since some communication sessions may be relatively short, e.g., limited to a few seconds, a data communications channel preferably has a maximum capacity of tens of kilobits per second or higher. In some cases, hundreds of kilobits, or megabit range bandwidths are achievable, especially with a small number of channels (e.g., one channel). Thus, for example, a DSSS spread spectrum transceiver operating in the 2.5 GHz band might have a usable bandwidth of 10 megabits per second, even while sharing the same band with other transceivers in close proximity. Where necessary, directional antennas or phased arrays may be employed to provide spatial discrimination.

The system preferably has advanced ability to detect channel conditions. Thus, where communications are interrupted by physical limitations in the channel, the impairment to the communications channel is detected and the communications session paused until the impairment abates. This, in turn, will allow other units, which might not be subject to the impairment, to use the same channel during this interval. The channel impairment may be detected by a feedback protocol between communications partners, or by means of symmetric antennas and communications systems, by which an impairment of a received signal may be presumed to affect the transmitted signal as well. The latter requires a high degree of standardization of equipment design and installation for effectiveness.

It is particularly noted that, where the events to be detected and the communications subsystem operate in the same band, structures may be shared between the communications and event detection systems, but this also increases the possibilities for interference.

As one embodiment of the invention, the processor may be provided as a standard personal digital assistant (PDA) with a PC Card or PCMCIA slot for receiving a standard GPS receiver module. The PDA, in turn has memory, which may include random access memory, flash memory, and rotating magnetic memory (hard disk), for example. The PDA also includes a data communications port, which sends data to and controls the communications subsystem, which may be, for example, model interfacing with, e.g., a cellular telephone or CDPD system. The PDA has a processing system which is capable of running applications written in general purpose, high level languages such as C. The PDA may operate under a standard operating system, such as Microsoft Windows CE, or a proprietary operating system. A software application written in a high level language can normally be ported to run in the PDA processing system. Thus, the basic elements of the hardware platform are all available without customization. In a preferred embodiment, an event sensor is provided, such as a police radar and laser speed detection equipment system (e.g., "radar detector") is provided. This may employ a modified commercially available radar detector, to produce a serial data stream or parallel signal set. For example, radar detectors providing an alphanumeric display often transmit data to the display controller by means of a serial data signal. This signal may be intercepted and interfaced with a serial port or custom port of the PDA.

Optionally, the GPS Smart Antenna is "differential-ready" to apply differential GPS (DGPS) error correction information to improve accuracy of a GPS determined location. The application program for the PDA may be provided in a semiconductor memory cartridge or stored on hard disk.

The PDA 30 includes the processing system, including a microprocessor, memory, pre-coded program instructions and data stored in memory, a microprocessor bus for addresses, data, and control, an interrupt bus for interrupt signals, and associated hardware, operates in a conventional manner to receive digital signals, process information, and issue digital signals. A user interface in the PDA includes a visual display or audible output to present signals received from the processing system to a user, a user entry system to issue signals from the user to the processing system. The user interface may include one or more push keys, toggle switches, proximity switches, trackballs, joysticks or pressure sensitive keys, a touch-sensitive display screen, microphones or a combination of any of the above used together or with other similar type user input methods. The PDA sends digital signals representing addresses, data, and commands to the memory device and receives digital signals representing instructions and data from the memory. A PDA interface electrically connects the processing system to a GPS Smart Antenna. If the PDA and GPS are not integrated, a preferred interface comprises a computer-standard low to medium speed serial data interface, such as RS-232, RS-422, or USB, through a cabled interface for connection to the GPS Smart Antenna.

The GPS Smart Antenna system includes a GPS receiver antenna to receive GPS satellite signals from GPS satellite transmitters, a GPS frequency downconverter to downconvert the approximately 1.575 GHz frequency of the L1 GPS satellite signals to a lower frequency (LF) signal that is suitable for digital processing, and to issue the LF to a GPS processor. The GPS processor demodulates and decodes the LF signal and provides location information for at least one of (i) location of the GPS antenna, (ii) GPS satellite pseudoranges between the GPS satellites and the GPS antenna, (iii) rate of change of location of the GPS antenna, (iv) heading of the GPS antenna, and (v) time to a GPS interface. Optionally, the GPS Smart Antenna and GPS processor are differential-ready. An optional input select switch, controlled by the GPS processor upon a request from the PDA, allows a single serial interface to receive either a control signal from the PDA or a DGPS error correction signal from an optional DGPS radio-wave receiver. Alternately, a DGPS-type system may be coordinated between multiple mobile receivers, top provide high relative position accuracy, even where the absolute position accuracy is low. Since the event position calculations are based on the relative position frame, the effect is to accurately position the events with respect to the vehicle.

The user device may display, for example, map features according to a coordinate system such as latitude and longitude. The display may also include an indication of the location of the GPS receiver, an itinerary, proposed route, and indications of the location of various events. By correlating the GPS with a stored map, the absolute location of the vehicle may be determined by map matching techniques. In accordance with the present invention, these events are derived from the event detector or the memory. Other communications devices may also be located on the display.

The user entry system has both touchscreen keys and press keys in the present embodiment. With a touchscreen, a user enters a request by touching a designated portion overlying a visual display with his finger (or soft pointer, such as a plastic pen). The touchscreen senses the touch and causes a digital signal to be sent to the processing system indicating where the touch was made. Switches such as rotary switches, toggle switches, or other switches can equally well be applied. An advantage of the touchscreen is that a label or a placement of the touchscreen, and a corresponding function of the touchscreen, may be changed by the computer controlling the display any number of times without changing electrical or mechanical hardware. In the present embodiment, zoom keys may be employed change scale and resolution of a map on the display. Zooming in decreases the scale, so that the map is viewed with greater resolution over a lesser area of the map. Zooming out increases the scale, so that a greater area of the map is viewed with lesser resolution. A map orientation key selects an orientation of a direction on the map with a direction on the visual display, for example, orientations of north up or current ground track up. It is noted that these map functions are generally known, and known techniques may be generally applied for such map functions. According to the present invention, in addition to normal map functions, the event data may be overlayed on the map to provide additional dimensions of display data. Further, by providing these data, which are dynamic, the map system becomes useful even to travelers who are well aware of the geography and layout of the region being traveled.

A 900 MHz spread spectrum communications system operates as follows. The RF receiver includes an antenna, low noise amplifier (LNA) with a noise temperature below 80 degrees Kelvin and a helical bandpass filter to cancel the image frequency noise. The filtered signal is then downconverted to an intermediate frequency (IF) of about 70 MHz, which is the result of mixing the filtered received signal with a local oscillator signal of between about 832-858 MHz at about 17 dbm. Of course, other tuning frequencies may be selected, for example, to avoid interference with other equipment. The local oscillator thus operates at about 850 MHz and is locked to a reference of 10.625 MHz. The 70 MHz IF frequency is amplified and filtered by a SAW filter 906 with a bandwidth of 1.5-10 MHz, depending on the data signal bandwidth. The IF is then demodulated to baseband, employing a demodulator using an inverse sequence from the transmitted spread spectrum sequence. Thus, in a frequency hopping embodiment, the demodulator synthesizes a signal having the appropriate frequency sequence. In a direct sequence spread spectrum embodiment, the demodulator provides the appropriate pseudorandom code sequence to demodulate the received signal. Time synchronization may be effected by using the timing functions of the GPS receiver. The demodulated signal is then decoded into messages, which are typically digital bitstreams.

In a 2.4 GHz system, the RF semiconductor technology will typically include gallium arsenide integrated circuits. In a 5.8 GHz system, the RF section semiconductors are preferably silicon germanium. Once demodulated to below about 1 GHz, standard silicon technologies may be employed.

The baseband demodulator may also comprise a digital radio, employing a digital signal processor, receiving a digitized IF signal and outputting a data stream. In this case, it may be preferred to digitize at an IF frequency below 70 MHz. For example, with a data stream having a bandwidth of 1.5 MHz, the preferred IF is 3-10 MHz, with quadrature digitization of the analog signal at that IF. The IF signal may be processed in parallel with a plurality of demodulators, allowing multiple signals to be received simultaneously.

In the 900 MHz embodiment, a PLL, such as a 1.1 gigahertz PLL frequency synthesizer, Part No. MC145190 available from Motorola Semiconductors, Phoenix, Ariz, may be used to generate the first IF. This frequency synthesizer, referenced to the 9.6 megahertz reference frequency, generates a local oscillator signal of approximately 860 megahertz. This PLL synthesizer chip produces a locked stable output signal which is low pass filtered to produce a variable voltage to control voltage control oscillator. VCO is, for example, Part No. MQC505-900 operating at approximately 860 megahertz and available from Murata of Tokyo, Japan. The feedback through sense keeps synthesizer chip stable to produce a stable, fixed course output. A second PLL produces a fine control frequency. The second PLL includes a synthesizer chip, e.g., Part No. MC145170 available from Motorola Semiconductor of Phoenix, Ariz. This PLL frequency synthesizer chip has digital controls for control by a microcontroller. The output of the fine synthesizer chip is low pass filtered to produce a variable DC voltage to control a voltage controlled oscillator, e.g., Part No. MQC309-964, operating within the 900 megahertz band. The fine adjust frequency is band pass filtered with an SAW band pass filter with a center frequency of approximately 38 megahertz. The band pass filter is, for example, Part No. SAF38.9MZR80Z also available from Murata of Tokyo, Japan. The output of the second PLL is controlled in accordance with the output frequency desired based on the frequency of the hop transmitted at the current time. By adjusting the fine frequency, which would be mixed with the coarse frequency, the output frequency in the 900 megahertz band is produced with very little phase noise, very little phase jitter and extremely narrow noise skirt. Thus, this double loop system serves to demodulate the signal to a low IF frequency or to baseband.

There has thus been shown and described novel communications devices and systems and methods which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A location-aware system, comprising:
    a sensor configured to determine a location of the location-aware system;
    a receiver comprising a mobile transceiver which is configured to interact with an on-line database and for receiving at least information relevant to the determined location; and
    a user interface configured to present a plurality of types of information prioritized based at least on the determined location and a type of information.

2. The location-aware system according to claim 1, wherein the system is configured for attachment to a vehicle.

3. The location-aware system according to claim 1, wherein the receiver comprises a satellite receiver configured to receive a signal from at least one satellite.

4. The location-aware system according to claim 3, wherein the sensor comprises a satellite receiver configured to receive a signal from a plurality of satellites.

5. The location-aware system according to claim 1, wherein the receiver comprises a digital cellular communications transceiver.

6. The location-aware system according to claim 1, wherein the sensor comprises a digital cellular communications device.

7. The location-aware system according to claim 1, wherein the receiver comprises a transceiver further configured to communicate with a respective transceiver of a compatible location-aware system.

8. The location-aware system according to claim 7, wherein the location-aware system and compatible location-aware system each are configured to exchange location information, and information relevant to the determined location of the received location information, with each other.

9. The location-aware system according to claim 1, further comprising:
    a transceiver configured to communicate at least information relevant to the determined location directly with at least one mobile transceiver.

10. The location-aware system according to claim 1, wherein the receiver is configured to communicate with the on-line database through a repeater network.

11. The location-aware system according to claim 10, wherein the receiver comprises a transceiver configured to communicate through the repeater network, wherein at least one repeater of the repeater network comprises a mobile transceiver.

12. The location-aware system according to claim 9, wherein the transceiver is further configured to communicate with at least one stationary transceiver.

13. The location-aware system according to claim 1, further comprising a navigation system.

14. The location-aware system according to claim 13, wherein the navigation system is configured to output traffic information.

15. The location-aware system according to claim 1, further comprising a traffic condition sensor.

16. The location-aware system according to claim 1, further comprising an environmental condition sensor.

17. The location-aware system according to claim 1, further comprising a transmitter adapted to transmit at least one of traffic information and environmental condition information.

18. The location-aware system according to claim 1, wherein the receiver is configured to receive at least one of traffic information and environmental condition information.

19. A location-aware system, comprising:
    a sensor configured to determine a location of the location-aware system;
    a receiver configured to receive at least information relevant to the determined location; and
    a user interface configured to present a plurality of types of information prioritized based at least on the determined location and a type of information, wherein the plurality of types of information comprise at least dynamic traffic information and static navigational information.

20. A location-aware system, comprising:
    a sensor configured to determine a location of the location-aware system;
    a receiver configured to receive at least information relevant to the determined location; and
    a user interface configured to present a plurality of types of information prioritized based at least on the determined location and a type of information,
    wherein the receiver comprises a transceiver which is configured to communicate at least one of vetronics information, the location, an itinerary, emergency information, distress information, vehicle maintenance information, and diagnostic information.

21. A location-aware system, comprising:
    a sensor configured to determine a location of the location-aware system;
    a receiver configured to receive at least information relevant to the determined location; and
    a user interface configured to present a plurality of types of information prioritized based at least on the determined location and a type of information,
    wherein the receiver comprises a transceiver which is configured to communicate through a Dedicated Short Range Communication system.

22. A location-aware system, comprising:
    a sensor configured to determine a location of the location-aware system;
    a receiver configured to receive at least information relevant to the determined location; and
    a user interface configured to present a plurality of types of information prioritized based at least on the determined location and a type of information,
    wherein the receiver is configured to communicate with an intelligent transportation system.

23. A location-aware system, comprising:
a sensor configured to determine a location of the location-aware system;
a receiver configured to receive at least information relevant to the determined location; and
a user interface configured to present a plurality of types of information prioritized based at least on the determined location and a type of information,
wherein the receiver comprises a transceiver configured to conduct bidirectional secure encrypted spread spectrum communications.

24. A location-aware system, comprising:
a sensor configured to determine a location of the location-aware system;
a receiver configured to receive at least information relevant to the determined location; and
a user interface configured to present a plurality of types of information prioritized based at least on the determined location and a type of information,
wherein the receiver comprises a transceiver configured to communicate cryptographically authenticated communications.

25. A location-aware system, comprising:
a sensor configured to determine a location of the location-aware system;
a receiver configured to receive at least information relevant to the determined location; and
a user interface configured to present a plurality of types of information prioritized based at least on the determined location and a type of information,
wherein the receiver comprises a mobile wireless transceiver which is configured to communicate information through the Internet.

26. The location-aware system according to claim 25, wherein the plurality of types of information comprise at least dynamic traffic information and static navigational information.

27. A location-aware system, comprising:
a sensor configured to determine a location of the location-aware system;
a receiver configured to determine at least information relevant to the determined location;
a mobile videoconferencing system configured to transmit image and audio data from a camera and to receive image and audio data from a remote location; and
a user interface configured to present a plurality of types of information prioritized based at least on the determined location and a type of information and the received image and audio information,
wherein the receiver is configured to receive advertisements for presentation to a user through the user interface.

28. The location-aware system according to claim 27, wherein the receiver is configured to receive at least one advertisement for presentation to a user through the user interface, in dependence on the determined location.

29. A location-aware system, comprising:
a sensor configured to determine a location of the location-aware system;
a receiver configured to receive at least information relevant to the determined location; and
a user interface configured to present a plurality of types of information prioritized based at least on the determined location and a type of information,
wherein the at least one of: receiver is configured to communicate video information and the user interface is configured to present video information.

30. The location-aware system according to claim 29, wherein the user interface is configured to present video information.

31. A location-aware system, comprising:
a sensor configured to present a location of the location-aware system;
a receiver configured to present at least information relevant to the determined location; and
a user interface configured to present a plurality of types of information prioritized based at least on the determined location and a type of information, wherein the user interface comprises a speech interface.

32. The location-aware system according to claim 31, wherein the user interface is configured to perform speech recognition.

33. A location-aware system, comprising:
a sensor configured to determine a location of the location-aware system;
a receiver configured to receive at least information relevant to the determined location; and
a user interface configured to present a plurality of types of information prioritized based at least on the determined location and a type of information,
wherein at least one type of information comprises location-referenced information, further comprising a database configured to retrieve location-referenced information comprising a dynamic map overlay.

34. The location-aware system according to claim 25, wherein the user interface comprises a speech interface.

35. The location-aware system according to claim 33, wherein the location-referenced information comprises a set of landmarks.

36. The location-aware system according to claim 33, wherein the receiver is configured to receive location-referenced information which is communicated through the Internet.

37. The location-aware system according to claim 1, wherein the user interface comprises a touchscreen.

38. A location-aware system, comprising:
a sensor configured to determine a location of the location-aware system;
a receiver configured to receive at least information relevant to the determined location;
a user interface configured to present a plurality of types of information prioritized based at least on the determined location and a type of information; and
an alphanumeric information input configured to receive a message for transmission from the location-aware system through a transmitter.

39. The location-aware system according to claim 1, wherein the user interface comprises a graphic screen display.

40. A location-aware system, comprising:
a sensor configured to determine a location of the location-aware system;
a receiver configured to receive at least information relevant to the determined location;
a user interface configured to present a plurality of types of information prioritized based at least on the determined location and a type of information; and
a subsystem configured to implement a copy protection scheme.

41. A location-aware system, comprising:
a sensor configured to determine a location of the location-aware system;
a receiver configured to receive at least information relevant to the determined location;

a user interface configured to present a plurality of types of information prioritized based at least on the determined location and a type of information; and an integrated processor configured to control the sensor and the receiver.

42. A location-aware system, comprising:
a sensor configured to determine a location of the location-aware system;
a receiver configured to receive at least information relevant to the determined location;
a user interface configured to present a plurality of types of information prioritized based at least on the determined location and a type of information; and
an input port configured to receive an image signal.

43. The location-aware system according to claim 42, further comprising a camera.

44. A location-aware method, comprising:
determining a location of a mobile wireless receiver;
interacting with a remote on-line database;
receiving at least information relevant to the determined location; and
presenting to a user a plurality of types of information prioritized based at least on the determined location and a type of information.

45. The method according to claim 44, wherein said determining comprises receiving a signal from at least one satellite.

46. The method according to claim 44, wherein the information is received through a cellular communications device.

47. The method according to claim 44, further comprising communicating with a respective transceiver of a compatible location-aware system.

48. The method according to claim 47, further comprising exchanging location information, and information relevant to the determined location of the received location information, with another system.

49. The location-aware method according to claim 44, further comprising:
communicating directly with at least one mobile transceiver.

50. The location-aware method according to claim 44, further comprising:
communicating through a repeater network.

51. The method according to claim 50, wherein at least one repeater of the repeater network comprises a mobile transceiver.

52. The method according to claim 49, further comprising communicating with at least one stationary transceiver.

53. The method according to claim 44, further comprising providing navigation information to a user from a navigation system.

54. The method according to claim 44, further comprising outputting traffic information.

55. The method according to claim 44, further comprising sensing a traffic condition.

56. The method according to claim 44, further comprising sensing an environmental condition.

57. The method according to claim 44, further comprising transmitting at least one of traffic information and environmental condition information.

58. The method according to claim 44, further comprising receiving at least one of traffic information and environmental condition information.

59. A location-aware method, comprising:
determining a location of a mobile wireless receiver;
receiving at least information relevant to the determined location; and
presenting to a user a plurality of types of information prioritized based at least on the determined location and a type of information;
wherein a first type of information comprises dynamic traffic information and a second type of information comprises static navigational information.

60. A location-aware method, comprising:
determining a location of a mobile wireless receiver;
receiving at least information relevant to the determined location;
presenting to a user a plurality of types of information prioritized based at least on the determined location and a type of information; and
remotely communicating at least one of vetronics information, the location of the wireless receiver, an itinerary, emergency information, distress information, vehicle maintenance information, and diagnostic information.

61. A location-aware method, comprising:
determining a location of a mobile wireless receiver;
receiving at least information relevant to the determined location;
presenting to a user a plurality of types of information prioritized based at least on the determined location and a type of information; and
communicating through a Dedicated Short Range Communication system.

62. A location-aware method, comprising:
determining a location of a mobile wireless receiver;
receiving at least information relevant to the determined location;
presenting to a user a plurality of types of information prioritized based at least on the determined location and a type of information; and
communicating with an intelligent transportation system.

63. A location-aware method, comprising:
determining a location of a mobile wireless receiver;
receiving at least information relevant to the determined location;
presenting to a user a plurality of types of information prioritized based at least on the determined location and a type of information; and
conducting at least one of secure encrypted communications and cryptographically authenticated communications.

64. The method according to claim 43, wherein the communications comprise cryptographically authenticated communications.

65. A location-aware method, comprising:
determining a location of a mobile wireless receiver;
receiving at least information relevant to the determined location;
presenting to a user a plurality of types of information prioritized based at least on the determined location and a type of information; and
communicating with the Internet.

66. The method according to claim 65, further comprising interacting with a remote on-line database through the Internet.

67. A location-aware method, comprising:
determining a location of a mobile wireless receiver;
receiving at least a plurality of types of information relevant to an itinerary, comprising at least advertisements; and
presenting to a user a plurality of types of information comprising at least the advertisements, prioritized based at least on the determined location, the itinerary, and a type of information.

68. The method according to claim 67, further comprising adaptively predicting the itinerary.

69. The method according to claim 68, wherein the at least one advertisement for presentation to a user is received in dependence on the determined location.

70. A location-aware method, comprising:
 determining a location of a mobile wireless receiver;
 receiving at least information relevant to the determined location;
 presenting to a user a plurality of types of information prioritized based at least on the determined location and a type of information; and
 at least one of communicating video information and presenting video information.

71. The method according to claim 70, further comprising presenting video information.

72. A location-aware method, comprising:
 determining a location of a mobile wireless receiver;
 receiving at least information relevant to the determined location;
 presenting to a user a plurality of types of information prioritized based at least on the determined location and a type of information; and
 communicating with a user through a speech interface.

73. The method according to claim 72, further comprising performing speech recognition.

74. The method according to claim 44, further comprising retrieving location-referenced information from the on-line database.

75. The method according to claim 74, wherein the location-referenced information comprises a map.

76. The method according to claim 74, wherein the location-referenced information comprises a set of landmarks.

77. The method according to claim 74, wherein the location-referenced information comprises a dynamic information map overlay.

78. The method according to claim 44, further comprising the step of providing a touchscreen user interface.

79. A location-aware method, comprising:
 determining a location of a mobile wireless receiver;
 receiving at least information relevant to the determined location;
 presenting to a user a plurality of types of information prioritized based at least on the determined location and a type of information; and
 receiving an alphanumeric message for transmission from the wireless mobile receiver.

80. The method according to claim 44, further comprising providing a graphic screen display user interface.

81. A location-aware method, comprising:
 determining a location of a mobile wireless receiver;
 receiving at least information relevant to the determined location;
 presenting to a user a plurality of types of information prioritized based at least on the determined location and a type of information; and
 implementing a copy protection scheme.

82. The method according to claim 44, further comprising receiving data from a satellite.

83. The method according to claim 44, further comprising receiving an image signal.

84. The method according to claim 44, further comprising providing a camera which generates electronic image information.

85. The location-aware system according to claim 1, wherein:
 the sensor comprises a GPS location sensor configured to determine a geolocation, further comprising:
 a map database;
 a transmitter coupled with the GPS location sensor configured to wirelessly transmit information corresponding to the determined geolocation; and
 wherein the user interface is configured to present data corresponding to the determined geolocation, the map database, and the received information.

86. The location-aware system according to claim 85, wherein the transmitter and receiver comprise a cellular transceiver.

87. The location-aware method according to claim 44,
 wherein said determining comprises determining a geolocation with a satellite receiver system;
 further comprising:
 wirelessly transmitting information corresponding to the determined geolocation;
 wirelessly receiving at least the information relevant to the determined geolocation; and
 said presenting comprising presenting data corresponding to the determined geolocation, information retrieved from a map database, and the received information to a user.

88. A location-aware method, comprising:
 determining a location of a mobile wireless receiver;
 receiving at least information relevant to the determined location, comprising environmental data for a set of locations at specified times;
 determining spatial-temporal characteristics of the environmental data;
 presenting to a user a plurality of environmental data based on the determined location, determined spatial-temporal characteristics, and a time.

89. The method according to claim 88, further comprising predicting an importance to a user of the environmental data.

90. The method according to claim 88, wherein the alert comprises a hazard alert.

91. The method according to claim 88, wherein the environmental data comprises weather data.

92. The method according to claim 88, wherein the environmental data comprises traffic data.

93. The method according to claim 88, wherein the environmental data comprises impending collision data.

94. A navigational method, comprising:
 defining a proposed route with respect to a map database for a mobile system;
 receiving through a wireless receiver in the mobile system, information communicated through the Internet relating to at least one of: traffic conditions, road conditions, places of interest, itinerary stops, or fixed locations;
 determining a position of the mobile system;
 processing the received information in conjunction with the proposed route and determined position to determine a relevance thereof; and
 presenting to the user a relevance filtered subset of the received information.

95. A location-aware system, comprising:
 a navigation subsystem comprising a system configured to determine a location, and a map database;
 an input configured to receive at least an itinerary comprising at least one destination location;
 a wireless data communication subsystem configured to communicate information through the Internet and to at least receive at least navigation information relevant to the determined location; and a user interface device configured to present navigation information to a human user based on at least the determined location, the map database, and the itinerary, and to present the received relevant navigation information communicated through the wireless data communication system.

96. A location-aware system, comprising:
a vehicle position determining system;
a memory configured to store an itinerary for the vehicle;
a wireless data communication system configured to communicate externally to the vehicle through the Internet;
a display; and
a controller configured to receive and process information from the vehicle position determining system and the stored itinerary to determine a relationship therebetween, and to control the display to present at least information received through the wireless data communication system relevant to the location and itinerary.

97. A location-aware system, comprising:
a vehicle position determining system;
a memory configured to store an itinerary for the vehicle;
a wireless data communication system configured to communicate externally to the vehicle;
a display; and
a controller, configured to:
receive and process information from the vehicle position determining system and the stored itinerary to determine a relationship therebetween, and control the display to present at least information received through the wireless data communication system relevant to the location and itinerary, and
control the display to present commercial subsidized location relevant information.

98. A location-aware system, comprising:
a vehicle position determining system;
a memory configured to store an itinerary for the vehicle;
a wireless data communication system configured to communicate externally to the vehicle;
a display; and
a controller configured to receive and process information from the vehicle position determining system and the stored itinerary to determine a relationship therebetween, and to control the display to present at least information received through the wireless data communication system relevant to the location and itinerary; and
a user input port configured to permit a user to interact with a service through the wireless data communication system.

99. The location-aware system according to claim 98 wherein the user input port is further configured to permit a user to negotiate a commercial transaction with a service through the wireless data communication system.

100. A location-aware system, comprising:
a vehicle position determining system;
a memory configured to store an itinerary for the vehicle;
a wireless data communication system configured to communicate externally to the vehicle;
a display; and
a controller, said controller being configured to:
receive and process information from the vehicle position determining system and the stored itinerary to determine a relationship therebetween, and control the display to present at least information received through the wireless data communication system relevant to the location and itinerary, and
communicate at least one of the vehicle position, the itinerary, emergency information, distress information, vehicle maintenance information, diagnostic information, vetronics information, and theft detection information from a theft detector through the wireless data communication system.

101. The location-aware system according to claim 100, further comprising a commercial transaction system configured to communicate with the location-aware vehicular system through the wireless data communication system, the commercial transaction system being configured to operate in dependence on a communicated location of the vehicle.

102. The location-aware system according to claim 101, wherein the commercial transaction system is configured to operate in dependence on both the communicated location of the vehicle and a communicated itinerary of the vehicle.

103. The location-aware system according to claim 100, wherein the controller is configured to automatically communicate emergency or distress information through the wireless data communication system.

104. The location-aware system according to claim 100, further comprising a theft detector, wherein the controller is configured to transmit theft detection information.

105. The location-aware system according to claim 100, wherein the controller is configured to communicate vehicle maintenance or diagnostic information through the wireless data communication system.

106. A method comprising:
determining a location of a sensor;
storing a set of events, an associated location for an event, and a chronological parameter associated with an event;
communicating event information with a remote system; and
processing the determined location in conjunction with the stored set of events, to determine a priority thereof, and outputting a subset of the set of events in order of the determined priority.

107. The method according to claim 106, wherein the location is determined with a GPS receiver.

108. The method according to claim 106, wherein said communicating is conducted over a cellular communications network.

109. The method according to claim 106, wherein the chronological parameter is selected from the group consisting of time of detection of an event, a time of expiration of an event, a time of logging of an event to memory, periodic variations in an event, statistical mean time of expected recurrence of an event, and a time for presentation of event related information to a user.

110. The method according to claim 106, wherein said communicating comprises receiving event information from a remote system.

111. The method according to claim 106, wherein said communicating comprises transmitting event and location information to a remote system.

112. The method according to claim 106, wherein said communicating comprises transmitting and receiving event information to and from a remote system.

113. The method according to claim 106, wherein said communicating comprises wirelessly communicating through an unlicensed frequency band.

114. The method according to claim 106, wherein said processing prioritizes based on a proximity of a stored location to a sensed location.

115. The method according to claim 106, wherein said processing prioritizes based on a prospective conjunction of a sensed location with a stored location.

116. The method according to claim 106, wherein said processing prioritizes based on a type of event.

117. The method according to claim 106, wherein said processing prioritizes based on a spatial-temporal proximity of a stored location to loci defined by an itinerary.

118. The method according to claim 106, further comprising detecting an event.

119. The method according to claim 118, wherein said detecting selectively detects an electromagnetic emission.

120. The method according to claim 118, wherein the event is selected from one or more of the group selected from road conditions, road hazards, traffic conditions and weather conditions.

121. The method according to claim 118, further comprising detecting a potential source of interference in detection of the event.

122. The method according to claim 106, wherein the event comprises information relating to a commercial establishment.

123. The method according to claim 106, further comprising storing information defining an origin of information relating to an event.

124. The method according to claim 106, wherein said communicating is adaptive to one or more parameters selected from the group consisting of transmit power, data rate, data packet format, error detection scheme, error correction scheme, bandwidth allocation, modulation scheme, and encoding scheme.

125. The method according to claim 106, wherein said communicating communicates at least one signal encrypted using a public key-private key cipher.

126. The method according to claim 106, further comprising selectively responding to an authorization code, wherein said authorization code controls an availability of at least one of said communicating step and said processing step.

127. The method according to claim 106, wherein said communicating comprises first establishing communications with a remote system through a common control channel, and then employing a private channel for further communications.

128. A mobile navigation system comprising:
a satellite receiver system configured to determine a geolocation;
a map database;
a receiver configured to wirelessly receive at least information relating to the determined geolocation from the Internet; and
a user interface configured to present data corresponding to the determined geolocation, the map database, and the received information to a user.

129. The mobile navigation system according to claim 128, further comprising a transmitter configured to wirelessly transmit at least information corresponding to the determined geolocation, wherein the transmitter and receiver together comprise a cellular radio transceiver, and wherein the satellite receiver system is configured to be assisted by the cellular radio transceiver in determining the geolocation.

130. The mobile navigation system according to claim 129, wherein the user interface comprises a touchscreen.

131. The location-aware system according to claim 20, wherein the transceiver which is configured to communicate at least vetronics information.

132. The location-aware system according to claim 20, wherein the transceiver which is configured to communicate at least the location or an itinerary.

133. The location-aware system according to claim 20, wherein the transceiver which is configured to communicate at least emergency information or distress information.

134. The location-aware system according to claim 20, wherein the transceiver which is configured to communicate at least vehicle maintenance information or diagnostic information.

135. The location-aware system according to claim 21, wherein the receiver is configured to communicate with an intelligent transportation system.

136. The location-aware system according to claim 29, wherein the receiver is configured to communicate video information.

137. The location-aware method according to claim 60, wherein said remotely communication comprises communicating at least vetronics information.

138. The location-aware method according to claim 60, wherein said remotely communication comprises communicating at least the location or an itinerary.

139. The location-aware method according to claim 60, wherein said remotely communication comprises communicating at least emergency information or distress information.

140. The location-aware method according to claim 60, wherein said remotely communication comprises communicating at least vehicle maintenance information or diagnostic information.

141. The method according to claim 63, wherein the communications comprise secure encrypted communications.

142. The method according to claim 70, further comprising communicating video information.

143. The location-aware system according to claim 100, wherein the controller is configured to automatically communicate at least one of the vehicle position and itinerary through the wireless data communication system.

144. The location-aware system according to claim 100, wherein the controller is configured to automatically communicate at least one of emergency information, distress information, through the wireless data communication system.

145. The location-aware system according to claim 100, wherein the controller is configured to automatically communicate at least one of vehicle maintenance information, diagnostic information through the wireless data communication system.

146. The location-aware system according to claim 100, wherein the controller is configured to automatically communicate at least vetronics information through the wireless data communication system.

147. The location-aware system according to claim 27, wherein the user interface is configured to present advertisements to a user.

148. A location-aware mobile system, comprising:
a geolocation subsystem configured to determine a location of the mobile system;
a transceiver, configured to bidirectionally communicate dynamically changing information about the determined location; and
a navigation system configured to display at least a map of the location, and a plurality of different types of information received through the transceiver dynamically overlayed on the map, dependent on at least the determined location and a respective type of information.

149. A location-aware mobile system, comprising:
a geolocation subsystem configured to determine a location of the mobile system;

a transceiver, configured to transmit dynamically changing information in dependence on the determined location and to receive a plurality of different types of information dependent on the determined location; and a user interface configured to present the plurality of different types of information prioritized based at least on the determined location and a respective type of information.

150. A communication device, comprising:

a geolocation subsystem configured to determine a location of the communication device over time;

a digital cellular transceiver, configured to transmit the determined location of the communication device over time to an on-line database, and to receive roadway traffic information derived from other communication devices from the on-line database; and a navigation system configured to display at least a map, and traffic information received through the transceiver dynamically overlayed on the map.

151. A mobile navigation system comprising:

a processor executing applications under an operating system;

a satellite receiver system configured to determine a geolocation of the mobile navigation system;

a transmitter configured to transmit a determined geolocation;

a receiver configured to wirelessly receive at least information relating to the determined geolocation from a remote database through the Internet; and a user interface, generated by the processor, configured to present data corresponding to determined geolocation and the received information to a user on a map.

152. A mobile computing device comprising:

a global positioning system (GPS) component configured to determine a location;

a camera component configured to capture an image;

a processor configured to associate the location determined by the GPS component with the captured image;

a memory component configured to store the captured image and the location;

a touchscreen display configured to receive a first user input to send the stored captured image and the location to an Internet database;

a cellular packet data component configured, in response to the received first user input, to provide the stored captured image and the location to the Internet database having stored captured images from a plurality of mobile computing devices;

wherein the touchscreen display is further configured to receive a second user input to retrieve a second captured image that the user is authorized to receive from the Internet database; and wherein the cellular packet data component is further configured in response to the second user input to retrieve the second captured image from the Internet database.

153. The mobile computing device of claim 152, further comprising the processor configured to request a central database to deactivate user access to event information by another mobile computing device.

154. The mobile computing device of claim 152, further comprising the mobile computing device configured to communicate with a subscription based central database to access event information of the plurality of mobile computing devices.

155. A method for communication by a mobile computing device, the method comprising:

determining a location by a global positioning system (GPS) component of the mobile computing device;

capturing an image by a camera component of the mobile computing device;

associating a determined location by the GPS component with the captured image by a processor of the mobile computing device;

storing by a memory component the captured image and the associated determined location in the mobile computing device;

receiving by a touchscreen display of the mobile computing device a first user input to send the stored captured image and the associated determined location to an Internet database;

providing by a cellular packet data component of the mobile computing device, in response to the received first user input, the stored captured image and the associated determined location to the Internet database having stored captured images from a plurality of mobile computing devices;

receiving by the touchscreen display a second user input to retrieve a second captured image that the user is authorized to receive from the Internet database; and retrieving by the cellular packet data component, in response to the second user input, the second captured image from the Internet database.

156. The method of claim 155, further comprising requesting, by the processor, a central database to deactivate user access to event information by another mobile computing device.

157. The method of claim 155, further comprising the mobile computing device communicating with a subscription based central database for accessing event information of the plurality of mobile computing devices.

158. A mobile computing device comprising:

means for determining a location;

means for capturing an image;

means for associating the determined location with the captured image;

means for storing the captured image and the associated determined location;

means for receiving a first user input to send the stored captured image and the associated determined location to an Internet database and for receiving a second user input to retrieve a second captured image that the user is authorized to receive from the Internet database;

means for providing, in response to the received first user input, the stored captured image and the associated determined location to the Internet database having stored captured images from a plurality of mobile computing devices; and means for retrieving, in response to the second user input, the second captured image from the Internet database.

159. The mobile computing device of claim 158, further comprising means for requesting a central database to deactivate user access to event information by another mobile computing device.

160. The mobile computing device of claim 158, further comprising means for communicating with a subscription based central database to access event information of the plurality of mobile computing devices.

* * * * *